United States Patent
Kim et al.

(10) Patent No.: US 11,422,688 B2
(45) Date of Patent: Aug. 23, 2022

(54) MOBILE TERMINAL AND METHOD FOR CONTROLLING THE SAME

(71) Applicant: LG ELECTRONICS INC., Seoul (KR)

(72) Inventors: Eunhye Kim, Seoul (KR); Cheongha Park, Seoul (KR); Juhye Lee, Seoul (KR); Juha Hyun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 422 days.

(21) Appl. No.: 15/617,810

(22) Filed: Jun. 8, 2017

(65) Prior Publication Data
US 2018/0276630 A1   Sep. 27, 2018

(30) Foreign Application Priority Data

Mar. 21, 2017   (KR) .................. 10-2017-0035521

(51) Int. Cl.
*G06Q 20/40*   (2012.01)
*H04M 1/72463*   (2021.01)
(Continued)

(52) U.S. Cl.
CPC ............ *G06F 3/0488* (2013.01); *G06F 21/00* (2013.01); *G06F 21/316* (2013.01); *G06N 20/00* (2019.01); *G06Q 20/321* (2020.05); *G06Q 20/326* (2020.05); *G06Q 20/4016* (2013.01); *H04M 1/67* (2013.01); *H04M 1/72463* (2021.01); *H04R 3/00* (2013.01); *H04W 12/068* (2021.01);
(Continued)

(58) Field of Classification Search
CPC ...................................... G06Q 20/40
USPC .......................................................... 705/40
See application file for complete search history.

(56) References Cited

U.S. PATENT DOCUMENTS 9,319,221 B1 *   4/2016   Awad ..................... H04L 9/3231
9,483,628 B2 *   11/2016   Chatterton .............. G06F 21/31
(Continued)

FOREIGN PATENT DOCUMENTS

KR   20120109178   10/2012
KR   20160133238   11/2016

OTHER PUBLICATIONS

Korean Intellectual Property Office Application Serial No. 10-2017-0035521, Office Action dated Dec. 14, 2020, 5 pages.

*Primary Examiner* — Jessica Lemieux
(74) *Attorney, Agent, or Firm* — Lee Hong Degerman Kang & Waimey

(57) ABSTRACT

The present invention relates to a mobile terminal capable of user identification based on artificial intelligence technology. The present invention includes an artificial intelligence unit for generating a usage pattern related to an operation performed on the mobile terminal and generate a control command for executing any one of a plurality of operation modes having different security standards based on the generated usage pattern, and a control unit for executing any one of the plurality of operation modes in response to a control command generated by the artificial intelligence unit. The artificial intelligence unit monitors situation information regarding an operation performed on the mobile terminal, compares the generated payment pattern with the monitored situation information, and generates a control command for executing any one operation mode based on a comparison result.

10 Claims, 22 Drawing Sheets

(51) Int. Cl.
*G06F 3/0488* (2022.01)
*G06N 20/00* (2019.01)
*G06F 21/00* (2013.01)
*G06F 21/31* (2013.01)
*H04M 1/67* (2006.01)
*H04R 3/00* (2006.01)
*H04W 88/02* (2009.01)
*H04W 12/06* (2021.01)
*H04W 12/069* (2021.01)
*G06Q 20/32* (2012.01)
*H04L 9/40* (2022.01)
*H04R 1/02* (2006.01)
*G06N 3/08* (2006.01)
*G06N 5/00* (2006.01)
*G06N 3/12* (2006.01)
*G06N 7/00* (2006.01)
*H04W 12/68* (2021.01)

(52) U.S. Cl.
CPC ......... *H04W 12/069* (2021.01); *H04W 88/02* (2013.01); *G06N 3/08* (2013.01); *G06N 3/126* (2013.01); *G06N 5/003* (2013.01); *G06N 7/005* (2013.01); *H04L 63/083* (2013.01); *H04L 63/0861* (2013.01); *H04R 1/028* (2013.01); *H04R 2499/11* (2013.01); *H04W 12/68* (2021.01)

(56) References Cited

U.S. PATENT DOCUMENTS

| | | | |
|---|---|---|---|
| 9,778,813 B2* | 10/2017 | Shenfield | G06F 3/0488 |
| 10,416,777 B2* | 9/2019 | Zhu | G06F 1/1626 |
| 2018/0012003 A1* | 1/2018 | Asulin | G06F 21/316 |
| 2018/0239500 A1* | 8/2018 | Allen | G06F 3/0482 |

\* cited by examiner (a)

[LOCATION]

(b)

[USAGE PATTERN]

(c)

[PAYMENT PATTERN]

(a)

(b)

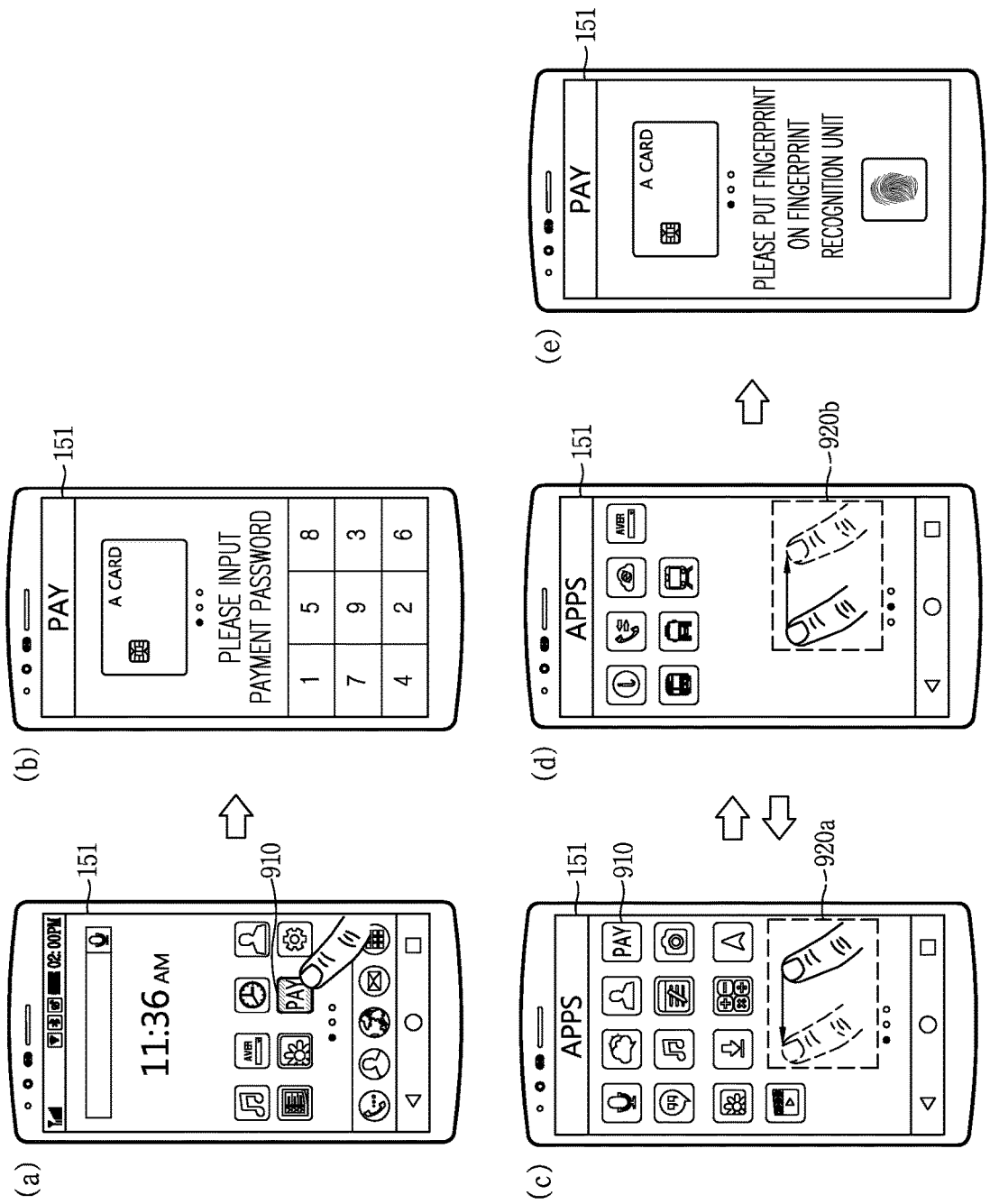

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2017-0035521, filed on Mar. 21, 2017, the contents of which are incorporated by reference herein in its entirety.

BACKGROUND OF THE INVENTION

1. Field of the Invention

The present invention relates to a mobile terminal capable of user identification based on artificial intelligence technology.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, artificial intelligence technology field that enables thinking similar to human intelligence has been developed dramatically based on a machine learning technique. Such artificial intelligence may allow machines to replace human actions for manipulating machines through conventional human thinking. Therefore, there are various movements to utilize artificial intelligence in various industrial fields.

On the other hand, various methods for utilizing artificial intelligence technology are proposed in the field of FinTech that combines finance and technology. When such a FinTech field is applied to a terminal, a security issue related to payment arises. Accordingly, the present invention proposes a method for enhancing payment related security by utilizing artificial intelligence.

In addition, the present invention proposes a method for enhancing security for usability of a mobile terminal in addition to payment.

SUMMARY OF THE INVENTION

Therefore, an aspect of the detailed description is to provide a method for enhancing the security of a mobile terminal by utilizing artificial intelligence.

Another aspect of the detailed description is to provide a method for guaranteeing the usability of a mobile terminal only to an authorized user by utilizing artificial intelligence.

Another aspect of the detailed description is to provide a method for enhancing the security of payment by utilizing artificial intelligence.

Another aspect of the detailed description is to provide a convenient payment method by utilizing artificial intelligence.

An embodiment of the present invention includes an artificial intelligence unit for generating a usage pattern related to an operation performed on the mobile terminal and generate a control command for executing any one of a plurality of operation modes having different security standards based on the generated usage pattern, and a control unit for executing any one of the plurality of operation modes in response to a control command generated by the artificial intelligence unit. The artificial intelligence unit monitors situation information regarding an operation performed on the mobile terminal, compares the generated payment pattern with the monitored situation information, and generates a control command for executing any one operation mode based on a comparison result.

In an embodiment, the plurality of payment modes include a first operation mode for controlling an operation of a mobile terminal based on a first security standard and a second operation mode for controlling an operation of a mobile terminal based on a second security standard higher than the first security standard.

In an embodiment, the artificial intelligence unit executes the first operation mode when a pre-learned usage pattern and the monitored user input match each other based on the comparison result, and executes the second operation mode when a pre-learned usage pattern and the monitored user input do not match each other based on the comparison result.

In one embodiment, the artificial intelligence unit monitors situation information regarding an operation performed on the mobile terminal when the first operation mode is executed, and switches the first operation mode to the second operation mode when the monitored situation information does not match the generated usage pattern.

In an embodiment, the second operation mode is a mode in which execution of some functions among the plurality of functions executable in the mobile terminal is limited.

In an embodiment, the artificial intelligence unit outputs notification information for requesting additional authentication before execution of the some functions, when an execution request for the limited some functions is received.

In an embodiment, the artificial intelligence unit performs the limited some functions when the additional authentication is performed.

In an embodiment, the present invention further includes a touch sensor formed to sense a touch input, and the artificial intelligence unit generates the use pattern based on a touch attribute of the touch input sensed by the touch sensor.

In an embodiment, the touch attribute includes at least one of a touch area of a touch input, a touch pressure of a touch input, a touch speed of a touch input, and information on a finger for applying a touch input.

In an embodiment, the mobile terminal has any one state of a locked state in which an operation of the mobile terminal is limited according to a user input and a released state in which an operation control of the mobile terminal is available according to a user input, and when the locked state is switched to the released state based on a user input applied in the locked state, the artificial intelligence unit selects any one of a plurality of operation modes having different security levels based on the user input applied in the locked state.

In another embodiment of the present invention, a mobile terminal includes an artificial intelligence unit for generating a payment pattern by learning history information regarding a payment performed on the mobile terminal, and an artificial intelligence unit monitors situation information regarding the payment, compares the generated payment pattern with the monitored situation information in response to an occurrence of a payment event, and determines a payment mode to be executed in response to the payment event among a plurality of payment modes having different security standards required during a payment performance based on a comparison result.

In an embodiment, the plurality of payment modes include a first payment mode capable of performing a payment based on authentication information according to a first security standard, and a second payment mode capable of performing a payment based on authentication information according to a second security standard higher than the first security standard.

In an embodiment, the second payment mode is a payment mode for performing a payment when satisfying both authentication information according to a first security standard and authentication information according to a second security standard, or a payment mode for performing a payment when satisfying the authentication information according to the second security standard instead of the authentication information according to the first security standard.

In an embodiment, the artificial intelligence unit determines whether the monitored situation information is a normal payment situation or an abnormal payment situation based on the generated payment pattern.

In an embodiment, the artificial intelligence unit executes a first payment mode if it is determined that the monitored situation information is a normal payment situation based on the generated payment pattern, and executes a second payment mode having a higher security standard than the first payment mode if it is determined that the monitored situation information is an abnormal payment situation based on the generated payment pattern.

In an embodiment, the history information regarding the payment includes at least one of payment location information, payment amount information, payment time information, payment item information, payment card information, and control signals related to a payment.

In an embodiment, the situation information includes at least one of location information, time information, mobile terminal usage pattern information, touch pressure information, touch area information, sound information, and fingerprint information.

In an embodiment, the plurality of payment modes include a reference mode set to be executed by default, and the artificial intelligence unit executes the reference mode in response to the generation of the payment event, and determines switching to a mode other than the reference mode among the plurality of payment modes according to the comparison result.

In an embodiment, the present invention further includes a memory configured to store schedule information of a user, and the monitored situation information includes location information on a payment to be executed, and the artificial intelligence unit determines that it is in an abnormal payment situation when a location where the payment to be executed is different from a location included in the schedule information, and based on a determination result, determines a payment mode to be executed according to the payment event among the plurality of payment modes.

In an embodiment, the present invention further includes a microphone formed to detect sound information in a background, and the artificial intelligence unit monitors the situation information based on the sound information.

In an embodiment, the present invention further includes a main body, and a grip sensor configured to detect a shape of a hand gripping the main body, and the artificial intelligence unit monitors the situation information based on the shape of the hand.

In an embodiment, the present invention further includes a display unit where a touch input is available, and the artificial intelligence unit monitors the situation information based on signals received from the display unit, and determines a payment mode to be executed according to the payment event occurrence among the plurality of payment modes based on the monitored situation information.

In an embodiment, when the payment amount included in the payment event is larger than the reference amount included in the learned payment pattern, the artificial intelligence unit executes a payment mode having a higher security level among the plurality of payment modes.

In an embodiment, the present invention further includes a display unit where a touch input is available, and the artificial intelligence unit monitors situation information based on a touch attribute of a touch input applied to the display unit at the time of occurrence of the payment event, and when the touch attribute of the touch input included in the monitored situation information is different from the touch attribute of the touch input included in the payment pattern, executes a payment mode having a higher security level among the plurality of payment modes.

In an embodiment, the artificial intelligence unit transmits notification information indicating that an abnormal payment is being performed to a predetermined external terminal when it is determined that the monitored situation information is an abnormal situation based on the comparison result.

In an embodiment, when a payment is approved according to the payment event in a state that the paid learning information and the monitored situation information are different from each other, the artificial intelligence unit may approve the payment in a state that it is possible to cancel the payment approval for a predetermined time.

In an embodiment, the artificial intelligence unit monitors the situation information after the payment approval, and cancels the approved payment based on the monitored situation information.

In another embodiment of the present invention, a control method a mobile terminal includes generating a payment pattern by learning history information regarding a payment performed on the mobile terminal, monitoring situation information regarding the payment, comparing the generated payment pattern with the monitored situation information in response to an occurrence of a payment event, and determining a payment mode to be executed in response to the payment event among a plurality of payment modes having different security standards required during a payment performance based on a comparison result.

In an embodiment, the plurality of payment modes include a first payment mode capable of performing a payment based on authentication information according to a first security standard, and a second payment mode capable of performing a payment based on authentication information according to a second security standard higher than the first security standard.

In an embodiment, the comparing operation determines whether the monitored situation information is a normal payment situation or an abnormal payment situation based on the generated payment pattern.

BRIEF DESCRIPTION OF THE DRAWINGS

In the drawings:

FIG. 9A is a conceptual diagram illustrating an embodiment for determining a payment mode according to an input pattern of a user input for executing a payment function.

DETAILED DESCRIPTION OF THE INVENTION

Figure 1:
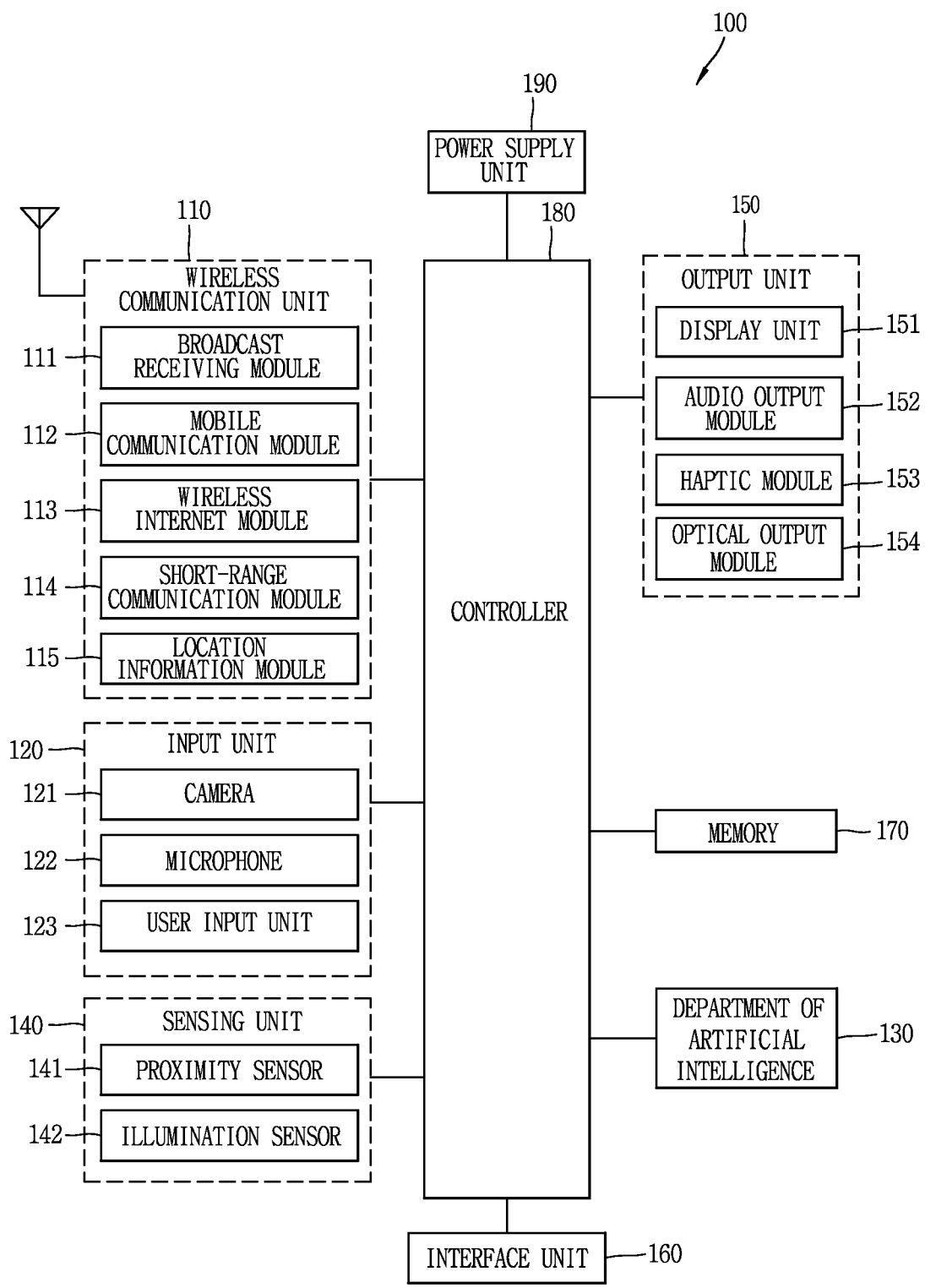
FIG. 1 is a conceptual diagram illustrating a usage example of an electronic device related to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

FIG. 1 is a block diagram illustrating a mobile terminal according to the present invention.

The mobile terminal 100 may be shown having components such as a wireless communication unit 110, an input unit 120, an artificial intelligence (AI) unit 130, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The artificial intelligence unit 130 plays a role of processing information based on an artificial intelligence technology and may include at least one module for performing at least one of learning of information, inference of information, perception of information, and processing of a natural language.

The artificial intelligence unit 130 may use a machine learning technology to execute at least one of extracting, learning, inference and processing of a large amount of information (big data), such as information stored in the mobile terminal, surrounding environment information of the mobile terminal, information stored in a communication-available external storage, etc. And the artificial intelligence unit 130 may predict (or infer) at least one executable operation of the mobile terminal based on the information learned using the machine learning technology, and control the mobile terminal to execute the most feasible operation among the at least one predicted operation.

The machine learning technology is a technology that collects and learns a large amount of information based on at least one algorithm, and determines and predicts information based on the learned information. The learning of information is an operation of grasping characteristics of information, rules and judgment criteria, quantifying a relation between information and information, and predicting new data using the quantified patterns.

Algorithms used by the machine learning technology may be algorithms based on statistics, for example, a decision tree that uses a tree structure type as a prediction model, an artificial neural network that mimics neural network structures and functions of living creatures, genetic programming based on biological evolutionary algorithms, clustering of distributing observed examples to a subset of clusters, a Monte Carlo method of computing function values as probability using randomly-extracted random numbers, and the like.

As one field of the machine learning technology, deep learning is a technology of performing at least one of learning, determining, and processing information using the artificial neural network algorithm. The artificial neural network may have a structure of linking layers and transferring data between the layers. This deep learning technology may be employed to learn vast amounts of information through the artificial neural network using a graphic processing unit (GPU) optimized for parallel computing.

Meanwhile, the artificial intelligence unit 130 may collect (sense, monitor, extract, detect, receive) signals, data and information input or output among components of the mobile terminal, in order to collect vast amounts of information for applying the machine learning technology. Also, the artificial intelligence unit 130 may collect (sense, monitor, extract, detect, receive) data, information and the like stored in an external storage (for example, a cloud server) connected through communication. More specifically, the collection of information may be understood as a term including an operation of sensing information through a sensor, extracting information stored in the memory 170, or receiving information from an external storage through communication.

The artificial intelligence unit 130 may sense information within the mobile terminal, surrounding environment information of the mobile terminal, and user information through the sensing unit 140. In addition, the artificial intelligence unit 130 may receive broadcast signals and/or broadcast-related information, wireless signals, wireless data, and the like through the wireless communication unit 110. The artificial intelligence unit 130 may also receive image information (or signal), audio information (or signal), data, or user-input information from an input unit.

The artificial intelligence unit 130 may collect vast amounts of information in real time in a background, learn the collected information, process the learned information into an appropriate form of information (for example, knowledge graph, command policy, personalization database, dialog engine, etc.), and store the processed information in the memory 170.

When the operation of the mobile terminal is predicted based on the information learned using the machine learning technology, the artificial intelligence unit 130 may control the components of the mobile terminal to execute the predicted operation or transfer a control command for executing the predicted operation to the controller 180. The controller 180 may then execute the predicted operation by controlling the mobile terminal based on the control command.

Meanwhile, when a specific operation is executed, the artificial intelligence unit 130 may analyze history information indicating the execution of the specific operation through the machine learning technology and execute updating of previously-learned information based on the analyzed information. Accordingly, the artificial intelligence unit 130 can improve accuracy of such information prediction.

Meanwhile, in this specification, the artificial intelligence unit 130 and the controller 180 may be understood as the same component. In this instance, functions executed in the controller 180 described herein may be expressed as being executed in the artificial intelligence unit 130, and the controller 180 may be named as the artificial intelligence unit 130, or conversely the artificial intelligence unit 130 may be referred to as the controller 180.

On the other hand, in this specification, the artificial intelligence unit 130 and the controller 180 may be understood as separate components. In this instance, the artificial intelligence unit 130 and the controller 180 may execute various controls on the mobile terminal through data exchange with each other. The controller 180 may execute at least one function on the mobile terminal or control at least one of the components of the mobile terminal based on results derived from the artificial intelligence unit 130. Furthermore, the artificial intelligence unit 130 may also be operated under the control of the controller 180.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions. The memory 170 may be configured to store application programs or applications executed in the mobile terminal 100, data or instructions for operations of the mobile terminal 100, and data (for example, at least one algorithm information for machine learning, etc.) for operations of the artificial intelligence unit 130. Some of these application programs may be downloaded from an external server via wireless communication. Other application programs may be installed within the mobile terminal 100 at time of manufacturing or shipping (for example, receiving a call, placing a call, receiving a message, sending a message, and the like). Meanwhile, the application programs may be stored in the memory 170 and installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1 in order to execute an application program that have been stored in the memory 170. In addition, the controller 180 may control at least two of those components included in the mobile terminal to activate the application program.

The power supply unit 190 is configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

A mobile terminal including one or more of the above-described components may utilize artificial intelligence to provide a method for allowing a user having legitimate rights to use the mobile terminal. Hereinafter, this will be described in detail with reference to the drawings.

Figure 2:
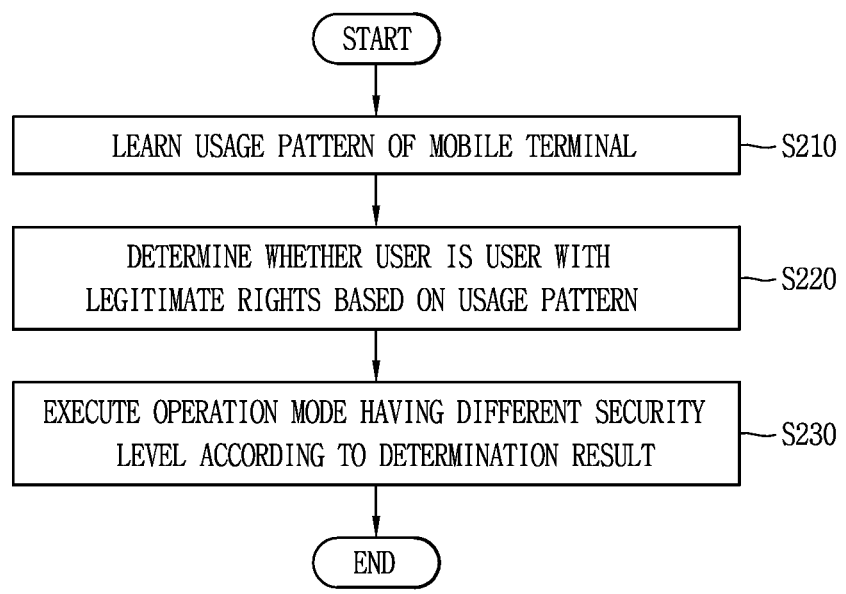
FIG. 2 is a flowchart illustrating a method for controlling an operation of a mobile terminal according to the usage rights of a user of the mobile terminal.
Figure 3:
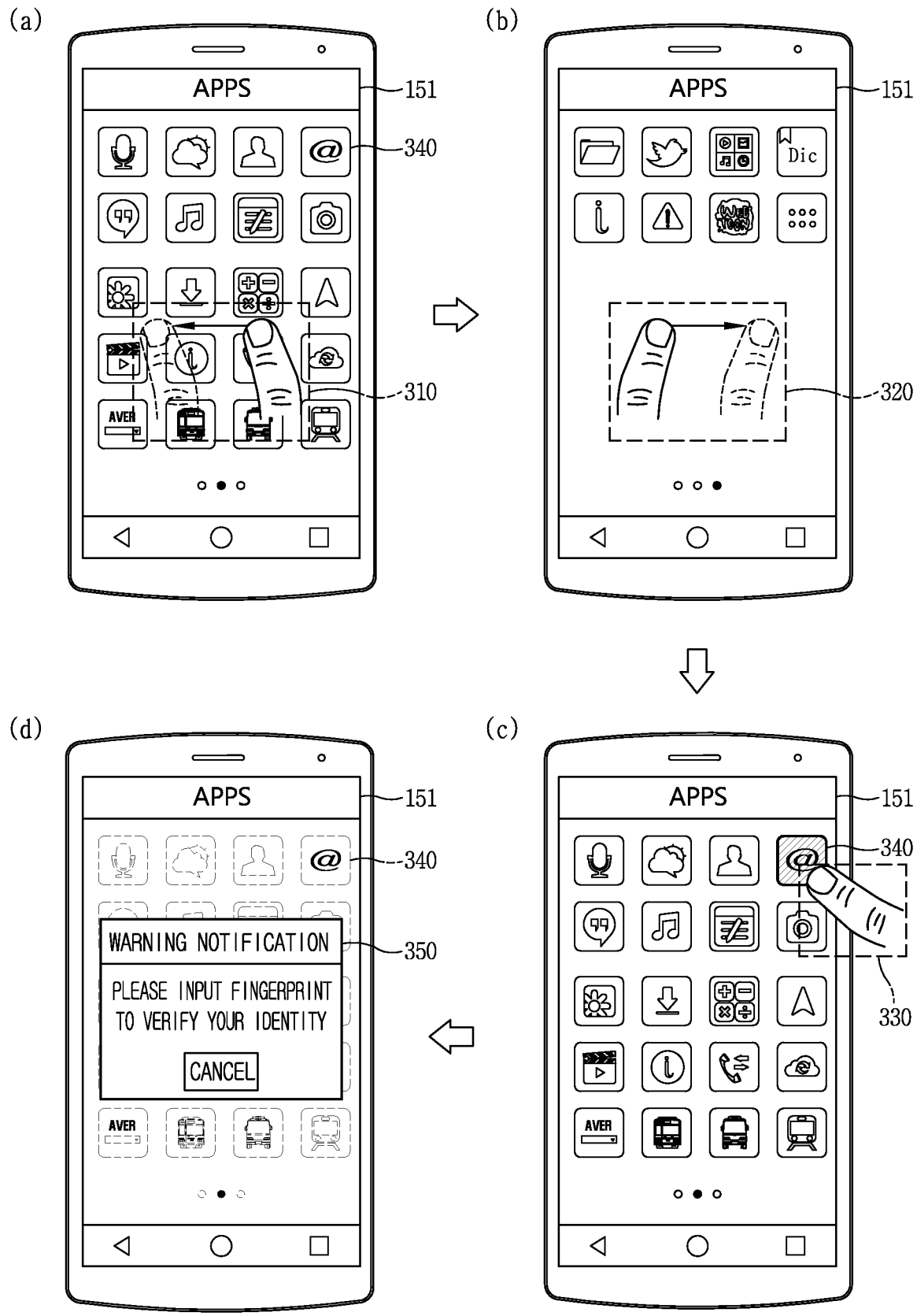
FIG. 3 is a conceptual diagram for describing the control method of FIG. 2.

FIG. 2 is a flowchart illustrating a method for controlling an operation of a mobile terminal according to a usage pattern of a user of the mobile terminal. FIG. 3 is a conceptual diagram for describing the control method of FIG. 2.

Referring to FIG. 2, an artificial intelligence unit 130 of the mobile terminal according to the present invention may learn a usage pattern of the mobile terminal (S210).

A control unit 180 may monitor (or detect or recognize) the usage pattern of the mobile terminal in the background. The operation in the background means that the mobile terminal is operated so as not to be recognized by a user.

The usage pattern of the mobile terminal is information regarding the usage habits of a user of the mobile terminal, who uses the mobile terminal. Specifically, the usage pattern includes an input pattern of a user input applied to a terminal, a usage pattern of an application installed in the mobile terminal, a time pattern using the mobile terminal, a shape pattern of a hand holding the main body of the mobile terminal, and a place pattern used by the mobile pattern.

The input pattern of the user input may include an input pattern of a user input related to execution of a specific function and an input pattern of a user input related to an operation control of the mobile terminal. The user input applied to the terminal may include various input methods such as a touch input, a button input, a fingerprint input, and a voice input.

The input pattern of the user input may be a pattern generated according to a combination of an input order of a user input, a number of times of input, an input type, and an input method, which are related to execution of a specific function. For example, an input pattern of a user input may be generated by a combination of an input sequence of a plurality of touch inputs, a touch type, and a touch method, which are applied for execution of a payment application. As another example, an input pattern of a user input may be generated by a combination of an input order, an input type, and an input method for the user input for releasing the locked state of the mobile terminal.

In addition, the input pattern of the user input may include input attribute information of a user input related to execution of a specific function. For example, the input attribute information of a touch input may include a touch area, a touch pressure, information on a finger for applying a touch, a touch type, and a touch speed.

The artificial intelligence unit 130 may monitor the user input to learn the usage pattern of such a user input.

More specifically, the control unit 180 may monitor the usage pattern based on data inputted to or outputted from the sensing unit 140 of the mobile terminal or the components of the mobile terminal. For example, the control unit 180 may monitor the touch input inputted through a touch sensor.

As another example, the control unit 180 may monitor the input order of a user input for executing a camera function. The user input for executing the camera function may include a drag touch input for searching a camera application from a list of icons of a plurality of applications and a short touch input for selecting an icon of the camera application. In this case, the control unit 180 may monitor the number and directions of drag touch inputs, the number and directions of short touch inputs, and the input order of the drag touch inputs and the short touch inputs.

Meanwhile, the artificial intelligence unit 130 may learn the usage pattern monitored by the control unit 180 based on the machine learning technique. For example, the artificial intelligence unit 130 may extract common components and difference components from a plurality of usage patterns, and classify a plurality of usage patterns according to the extracted common components and difference components. Meanwhile, since various statistical algorithms are used in the machine learning technique, the artificial intelligence unit 130 may learn a plurality of usage patterns in various ways in addition to the method described above.

Such usage patterns may be different for each user. Therefore, the artificial intelligence unit 130 may distinguish a user who applies a user input to the current mobile terminal, based on the learned usage pattern.

The artificial intelligence unit 130 may determine whether the user is a user having legitimate rights based on the usage pattern (S220).

The legitimate rights are rights to use the mobile terminal. These legitimate rights may be set differently for each user.

Specifically, a user who is mainly using the mobile terminal may be a real owner of the mobile terminal. Conversely, a user without legitimate rights may be a user who does not primarily use the mobile terminal. For example, if A is a user who mainly uses a mobile terminal, A is a user having legitimate rights, and B not mainly using a mobile terminal is a user without legitimate rights. Here, the user who mainly uses the mobile terminal is a user who has a history of using the mobile terminal more than the predetermined number of times.

The legitimate rights may be set to a specific user with the same authority for all the functions that are executable in the mobile terminal and for the operations of the mobile terminal, and different rights may be set for each application installed in the mobile terminal. For example, the artificial intelligence unit 130 may set legitimate rights for a camera application and may not set legitimate rights for a gallery application for a particular user.

Meanwhile, the legitimate rights may be set according to the usage pattern of the mobile terminal. That is, the artificial intelligence unit 130 may learn the usage pattern and set the most learned usage pattern to a usage pattern of a user having legitimate rights.

Accordingly, the artificial intelligence unit 130 may determine whether a user who applies a user input to the current mobile terminal has legitimate rights, based on the usage pattern of the user having the legitimate rights.

More specifically, the artificial intelligence unit 130 may monitor the user input inputted to the mobile terminal. Then, the artificial intelligence unit 130 may predict a function to be executed according to the monitored user input.

Then, in order to determine whether a user who inputs the monitored user input is a user having legitimate rights, the artificial intelligence unit 130 may compare the pre-learned usage pattern of the predicted function with the currently monitored usage pattern. For example, the artificial intelligence unit 130 may compare the input order of the drag touch input and the short touch input for executing the camera application with the pre-learned input order.

The artificial intelligence unit 130 may determine whether the currently monitored usage pattern corresponds to the pre-learned usage pattern based on the comparison result. For example, the artificial intelligence unit 130 may calculate the probability that the currently monitored usage pattern corresponds to the pre-learned usage pattern, based on the comparison result. Then, if the calculated probability is greater than or equal to a predetermined value, the artificial intelligence unit 130 may determine that the currently monitored usage pattern corresponds to the pre-learned usage pattern. Conversely, if the calculated probability is less than a predetermined value, the artificial intelligence unit 130 may determine that the currently monitored usage pattern does not correspond to the pre-learned usage pattern.

The probability judgment criterion may be determined by at least one component extracted from the usage pattern. That is, the artificial intelligence unit 130 may calculate the probability by comparing whether the currently monitored pattern matches the pre-learned pattern, based on the extracted at least one element.

If the currently monitored usage pattern corresponds to the pre-learned usage pattern, the artificial intelligence unit 130 may determine that the user who inputs a user input to the current mobile terminal is a user having legitimate rights. Conversely, if the currently monitored usage pattern does not correspond to the pre-learned usage pattern, the artificial intelligence unit 130 may determine that the user who inputs a user input to the current mobile terminal is a user without legitimate rights.

Through this, the present invention may determine whether there are legitimate rights for a user to use the mobile terminal even if not requiring the user to provide separate password information. Therefore, the present invention may enhance the security of the mobile terminal without the risk of exposing the encryption information.

The control unit 180 may execute any one of a plurality of operation modes having different security levels according to the determination result of the artificial intelligence unit 130 (S230).

The artificial intelligence unit 130 may transmit to the control unit 180 a determination result on whether or not the user has legitimate rights. The control unit 180 may execute the predicted function in any one of a plurality of operation modes having different security levels according to the determination result.

The plurality of operation modes include an operation mode of the mobile terminal having different security standards. The operation mode is a mode for controlling the operation of the mobile terminal according to the security standard.

Hereinafter, for convenience of explanation, it is assumed and described that the plurality of operation modes include a first operation mode having a lower security standard and a second operation mode having a higher security standard than the first operation mode. However, the present invention is not limited thereto, and a plurality of operation modes may include various operation modes in which various security standards are set.

The security standard may be a setting standard for execution rights related to execution of functions installed in the mobile terminal. The execution right is setting information that allows execution of a specific function in the mobile terminal.

As the security standard of the operation mode becomes higher, the execution right for application becomes higher.

More specifically, in the second operation mode in which the security standard is high, the execution right may be restricted thereby preventing the executions of some applications among a plurality of applications installed in the mobile terminal. In this case, the execution right may be set so that the remaining applications may be executed. For example, in the second operation mode, the execution right may be set so that execution for a payment application with a high security standard is limited, and execution is possible for a web browser application with a low security standard.

In addition, in the first operation mode in which the security standard is low, the execution right may be set so that all the functions installed in the mobile terminal are executed. For example, when the first operation mode is in execution, the artificial intelligence unit 130 may execute a payment function without additional authentication according to the security standard set in the first operation mode.

Alternatively, the security standard may be a setting standard for an execution right that restricts the execution of an operation related to some of a plurality of menus provided by a specific application. For example, when there are a payment menu and a payment history confirmation menu provided by the payment application, the artificial intelligence unit 130 may set the execution right to restrict the execution of the operation related to the payment menu and allow the operation related to the payment history confirmation menu to be executed in a second security mode. As another example, the artificial intelligence unit 130 may set the execution right so that both the payment menu and the payment history confirmation menu may be executed in a first security mode.

Therefore, according to the present invention, the mobile terminal uses artificial intelligence to determine whether a user using the mobile terminal has legitimate rights, and based on the determination result, operate in any one of the first operation mode having a low security standard and the second operation mode having a high security standard. Through this, the mobile terminal may restrict the use of the mobile terminal of a user without legitimate rights, thereby enhancing the security of the mobile terminal.

On the other hand, the first operation mode may be a basic mode which is set to be executed basically when the power of the mobile terminal is turned on regardless of the usage pattern. Then, the control unit 180 may switch from the first operation mode to the second operation mode or switch from the second operation mode to the first operation mode according to a determination result on whether a user using the current mobile terminal is a legitimate user through the artificial intelligence unit 130.

Such a switching operation of an operation mode may be performed in various situations using the mobile terminal, such as when the mobile terminal is unlocked, or when a specific function is being executed in the mobile terminal.

As an example, the control unit 180 may switch the operation mode while a specific function is being executed in the mobile terminal.

For this, the artificial intelligence unit 130 may monitor an input pattern of a user input related to a specific function in the first operation mode. The user input related to the specific function may include a touch input applied before execution of a specific function, a touch input applied to execute a specific function, and a touch input applied during execution of a specific function.

The touch input applied before execution of the specific function may be a touch input applied between time points before a predetermined range based on a time point at which the touch input for executing a specific function is applied. For example, referring to FIGS. 3A to 3C, the touch input applied before execution of the specific function is a drag input 310 of FIG. 3A and a drag input 320 of FIG. 3B applied between time points before a predetermined range, on the basis of the time point at which the touch input 330 is applied to an icon 340 of a mail application of FIG. 3C.

The touch input applied to execute the specific function may be the touch input 330 for a specific function icon as shown in FIG. 3B.

An input pattern of a user input related to the specific function may be formed by a user input related to the specific function. More specifically, an input pattern of a user input related to the specific function may be formed by at least one of the number of user inputs related to the specific function, a type of a user input, an input area of a user input, an input pressure of a user input, and an input order in which a user input is applied. For example, as shown in FIGS. 3A to 3C, an input pattern of a user input related to the specific function may be a pattern in which the short touch input 330 is applied once after the two drag inputs 310 and 320.

The artificial intelligence unit 130 may compare the monitored input pattern with the pre-learned input pattern for the specific function. Then, if the monitored input pattern is different from the pre-learned input pattern based on the comparison result, the artificial intelligence unit 130 may determine that a user input for forming the monitored input pattern is not a user input applied by a legitimate user.

In this case, the artificial intelligence unit 130 may switch the first operation mode to the second operation mode, and deliver a control command for performing additional authentication to the control unit 180. The control unit 180 may perform additional authentication based on the control command for performing the additional authentication. For example, as shown in FIG. 3D, the control unit 180 may perform additional authentication and output on the display unit 151 notification information 3500 for requesting a user to perform additional authentication. Through this, a user may use a specific function after additional authentication.

In the above, a method for executing a plurality of operation modes having different security standards based on learned usage patterns through artificial intelligence is described. Through this, the present invention may restrict the use of the mobile terminal to a user without legitimate rights, thereby enhancing the security of the mobile terminal.

Hereinafter, the feature of switching an operation mode during execution of a specific function will be described in detail. FIGS. 4A to 4E are conceptual diagrams illustrating an embodiment related to a method for switching an operation mode during execution of a specific function.

The control unit 180 of the electronic device 100 according to the present invention may execute the first operation mode set to operate basically when the locked state is switched to the released state. Hereinafter, it is assumed and described that the first operation mode is being executed.

The artificial intelligence unit 130 may monitor an input pattern of a user input related to a specific function during execution of the specific function in the first operation mode. For example, as shown in (a) of FIG. 4A, when detecting that a drag input 410 is applied to an execution screen of an Internet application providing a function for accessing a web page, the artificial intelligence unit 130 may monitor the input pattern of the drag input 410.

The artificial intelligence unit 130 may predict a function to be performed according to the drag input 410 as a web page scroll function. The artificial intelligence unit 130 may compare the input pattern of the monitored drag input with the pre-learned input pattern of the web page scroll function. If they do not match each based on the comparison result, the control unit 180 may determine that the monitored drag input is not a user input inputted by a user having legitimate rights.

Figure 4A:
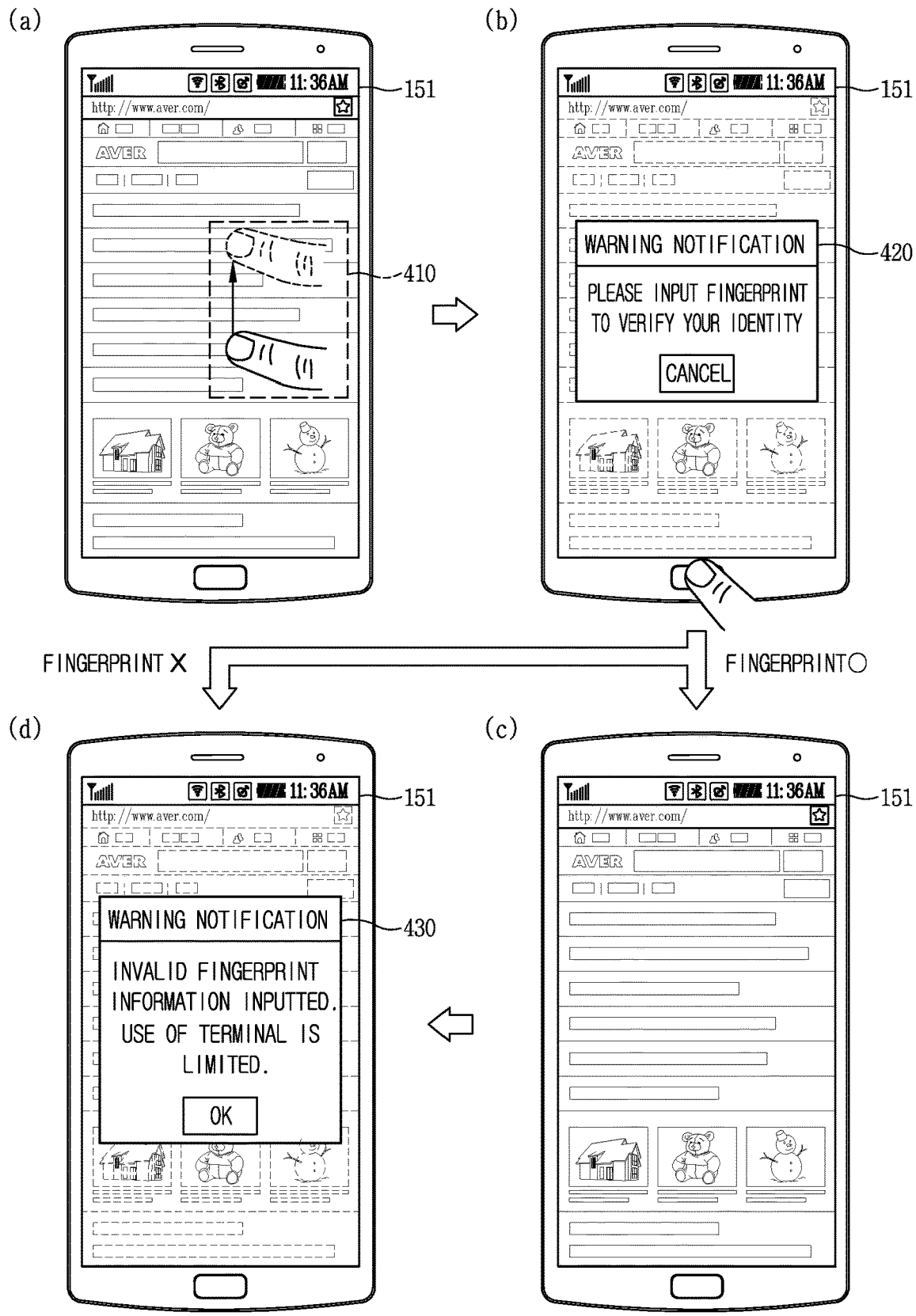
FIGS. 4A to 4E are conceptual diagrams illustrating an embodiment related to a method for switching an operation mode during execution of a specific function.

In this case, as shown in (b) of FIG. 4A, the control unit 180 may switch the first operation mode to the second operation mode, and according to the security standard set in the second operation mode, stop the control of the web page according to the drag input, and output notification information 420 for notifying that additional authentication is necessary. A user may recognize through the notification information 420 that additional authentication is required.

Various authentication methods may be used for the additional authentication. For example, various authentication methods implementable in a mobile terminal, such as fingerprint recognition, password input, password pattern input, iris recognition, and face recognition, may be used. The additional authentication method may be set by a user or set by a terminal manufacturer.

As shown in (c) of FIG. 4A, when the additional authentication is successfully performed, the control unit 180 may perform web page scroll in response to a drag input. The success of the additional authentication is an event in which the inputted password information corresponds to pre-stored password information. On the other hand, the failure of the additional authentication, as an event opposite to success, is an event in which the inputted password information does not correspond to the stored password information.

Unlike this, when the additional authentication fails, the control unit 180 may allow the web page to disappear from the display unit 151 so that a user without legitimate rights may no longer use the web page. In this case, the control unit 180 may output the notification information 530 to recognize that the user is not able to use the web page any more, as shown in (d) of FIG. 4A. Through this, the present invention may restrict the use of the mobile terminal when the use of the mobile terminal is detected by a user rather than a legitimate user even during execution of a specific application.

Meanwhile, in the second operation mode, the control unit 180 may restrict the execution of a specific function to prevent a user without legitimate rights from using the specific function but restrict a function execution corresponding to some of a plurality of menus provided by the specific function.

Here, the menus provided by the specific function may be items representing sub functions related to the specific function. For example, a social network service (SNS) application for providing an SNS function may provide a display menu for displaying articles, pictures, and videos stored in an SNS server, an upload menu for uploading articles, pictures, and videos to an SNS server, and a search menu for searching for articles, photos, videos stored in an SNS server.

For example, the artificial intelligence unit 130 may execute the SNS application in the second operation mode. At this time, as shown in (a) of FIG. 4B, the artificial intelligence unit 130 may execute a display menu for displaying articles, pictures, and videos stored in the SNS server in response to a user request, and display an execution screen 440a of the display function on the display unit 151.

Figure 4B:
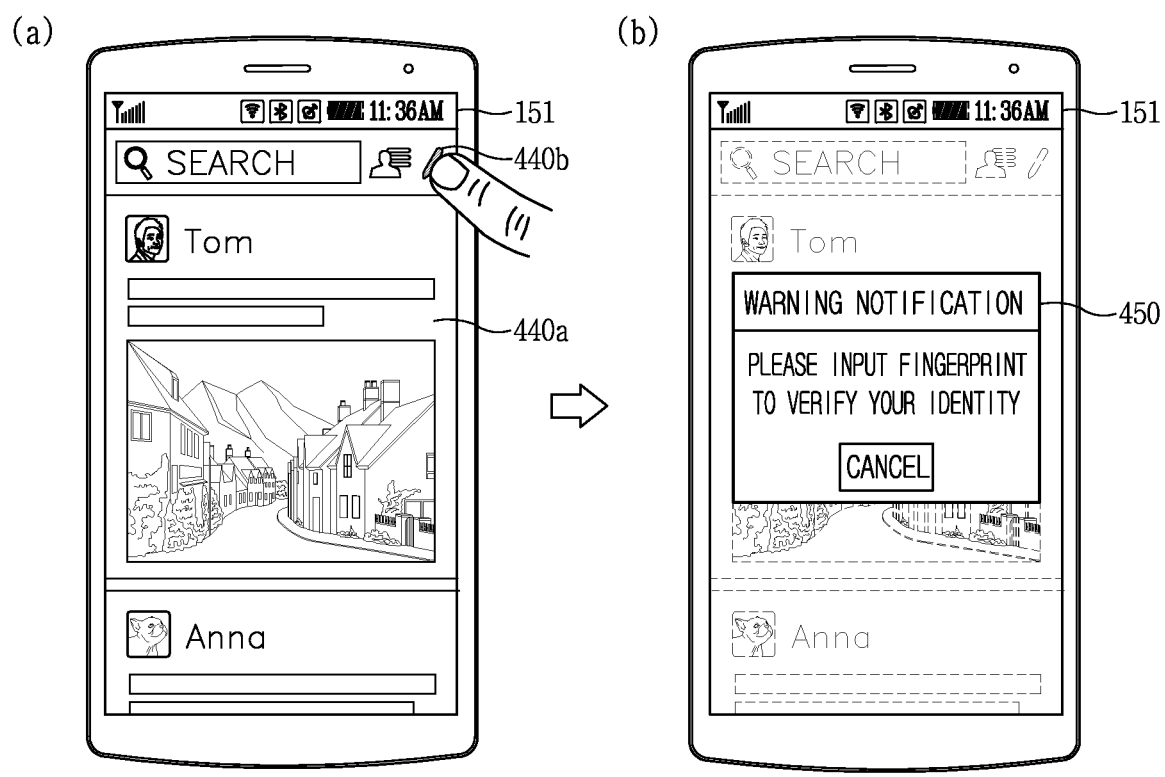

As shown in (b) of FIG. 4B, in the second operation mode, when receiving a user request for executing a function corresponding to an upload menu for uploading articles, pictures, and videos to the SNS server, the artificial intelligence unit 130 may restrict the execution of a function corresponding to the upload menu. Then, the artificial intelligence unit 130 may request additional authentication for execution of the upload menu.

Specifically, as shown in (b) of FIG. 4B, when a touch input is applied to an icon 440b for executing a function corresponding to the upload menu for uploading articles, pictures, and videos to the SNS server, the artificial intelligence unit 130 may output notification information 450 for requesting additional authentication. Therefore, the present invention may restrict the function execution of a user without legitimate rights with respect to a menu requiring a high security level among a plurality of menus provided by a specific function.

Meanwhile, although not shown in the drawing, the artificial intelligence unit 130 may perform a function corresponding to the upload menu if the additional authentication is successfully performed.

Figure 4C:
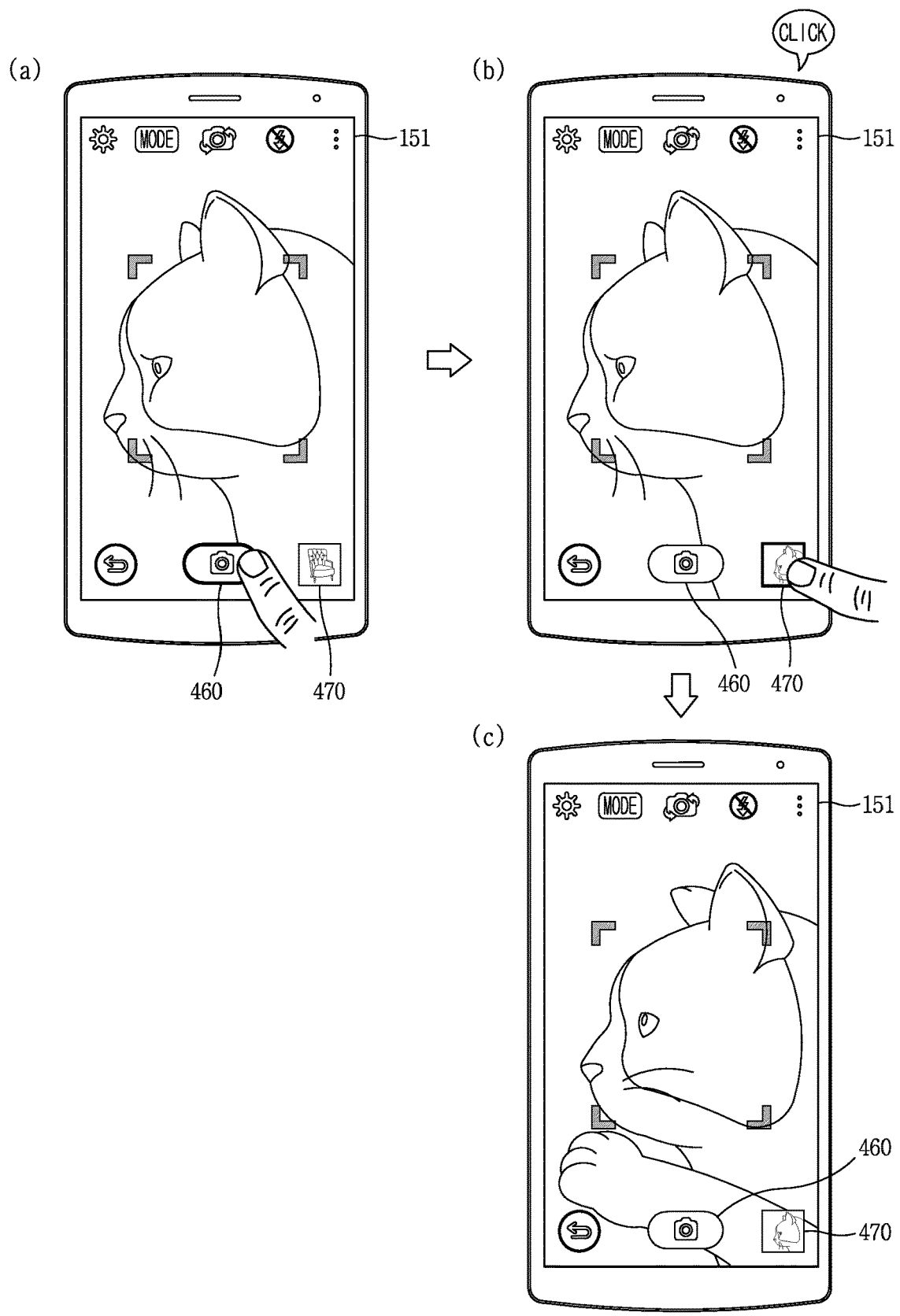

As another example, as shown in (a) of FIG. 4C, the artificial intelligence unit 130 may execute a camera application in the second operation mode. At this time, the artificial intelligence unit 130 may limit the executions of functions corresponding to some of the plurality of menus provided by the camera application.

For example, as shown in (a) and (b) of FIG. 4C, when the touch input is applied to a capture icon 460 for executing a function corresponding to the image capturing menu, the artificial intelligence unit 130 may execute a function corresponding to the image capturing menu. Unlike this, if a touch input is applied to an icon 470 for executing an image display menu stored in the memory 170, the artificial intelligence unit 130 may not execute a function corresponding to the image display menu. Through this, the present invention may restrict the executions of functions with high security level, and also easily provide functions with low security level.

In addition, according to the usage pattern of a mobile terminal, the present invention operates the mobile terminal in any one of the first operation mode and the second operation mode, so that even if the user is not required for the password information, it is possible to determine whether the user has legitimate rights. Therefore, the present invention may enhance the security of the mobile terminal without the risk of exposing the encryption information.

In addition, the artificial intelligence unit 130 may execute a specific function in different operation modes, based on the usage pattern of a user input applied at the time of execution of the specific function.

Figure 4D:
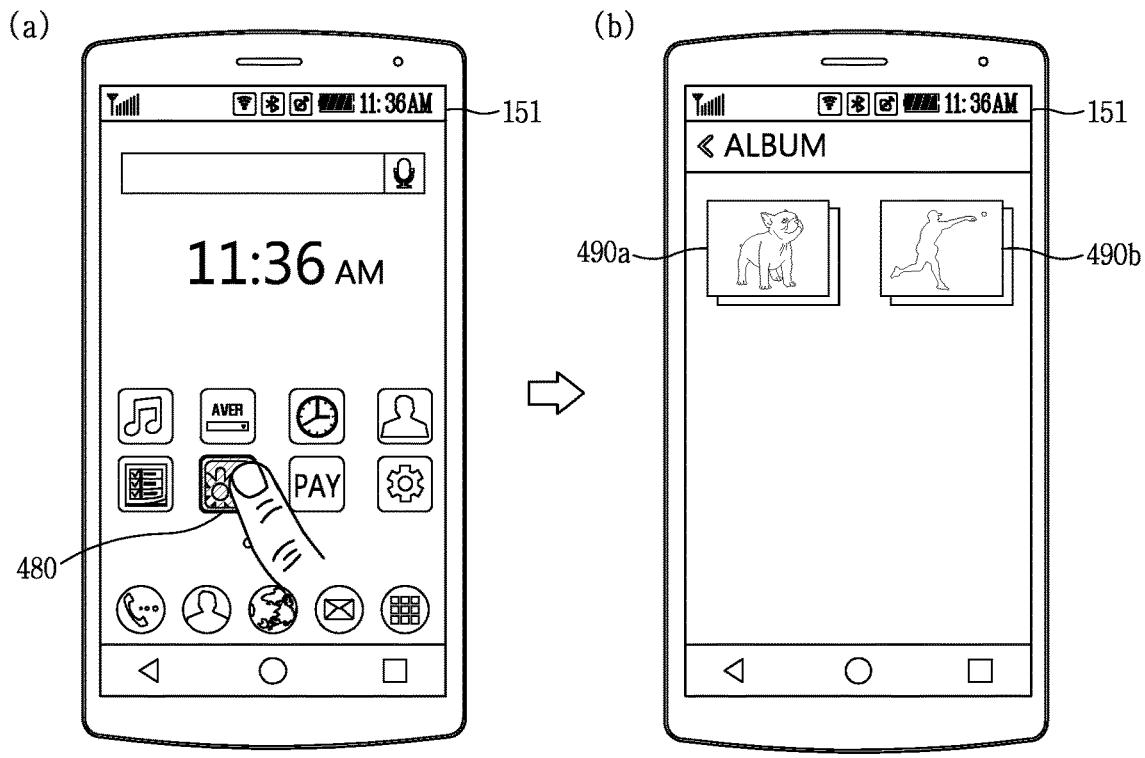

For example, as shown in (a) of FIG. 4D, the artificial intelligence unit 130 may detect that a touch input is applied to an icon 480 of a gallery application in the first operation mode in which the security standard is low. The gallery application is an application that provides a function of outputting a plurality of images stored in the memory 170 of the mobile terminal to the display unit 151.

The artificial intelligence unit 130 may determine whether the touch area of a touch input applied to the icon 480 of the gallery application matches the touch area included in the pre-learned usage pattern for the execution of the gallery application.

When the touch area of the touch input matches the pre-learned touch area, as shown in (b) of FIG. 4D, the artificial intelligence unit 130 may execute the gallery application according to the security standard set in the first operation mode, in response to the touch input applied to the icon 480 of the gallery application. In this case, the artificial intelligence unit 130 may display thumbnail images 490*a* and 490*b* of all the images stored in the memory 170 on the display unit 151.

Figure 4E:
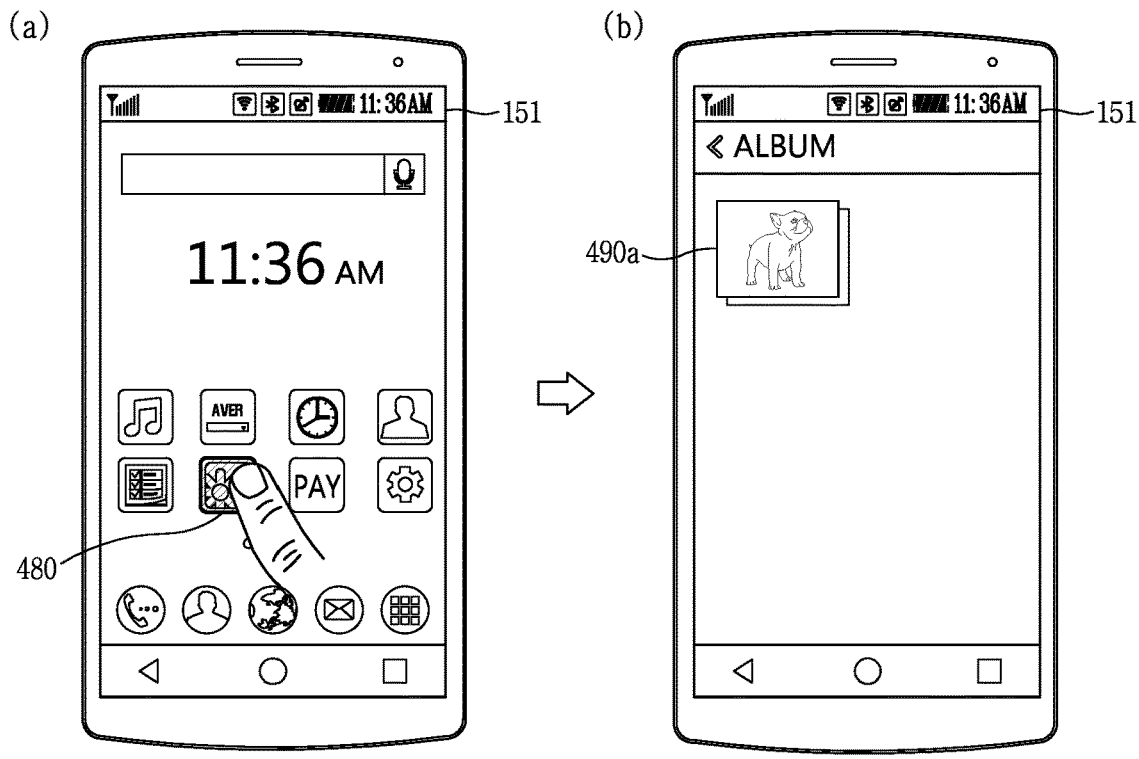

Unlike this, as shown in (a) of FIG. 4E, the artificial intelligence unit 130 may determine whether the touch area of a touch input applied to the gallery application does not match the touch area included in the pre-learned usage pattern for execution of the gallery application during the execution of the first operation mode with a low security standard. In this case, the artificial intelligence unit 130 may determine that the user of the mobile terminal is a user without legitimate rights, terminates the first operation mode, and execute the second operation mode.

As shown in (b) of FIG. 4E, the artificial intelligence unit 130 may execute the gallery application according to the security standard set in the second operation mode, in response to the touch input applied to the gallery application. In this case, only the thumbnails 490*a* of some images satisfying the security standard other than all the images stored in the memory 170 may be outputted to the display unit 151. Images for which thumbnails are not displayed may be protected information such as personal information, and may be images with security standard higher than that set in the second operation mode.

That is, the control unit 180 may restrict contents (e.g., images, videos, etc.) accessible through the gallery application according to the security standard set in the operation mode. The content whose access is restricted in such a manner may be set by a user or may be automatically set by the control unit 180 according to the content attribute information (e.g., contents). Through this, the present invention may restrict access to some contents with high security standards to a user without legitimate rights.

In the above, the method for switching an operation mode related to the execution of the specific function and the execution control of the specific function in each operation mode are described. Through this, the present invention may provide the functions of the mobile terminal in various forms according to the legitimate rights of a user.

Figure 5A:
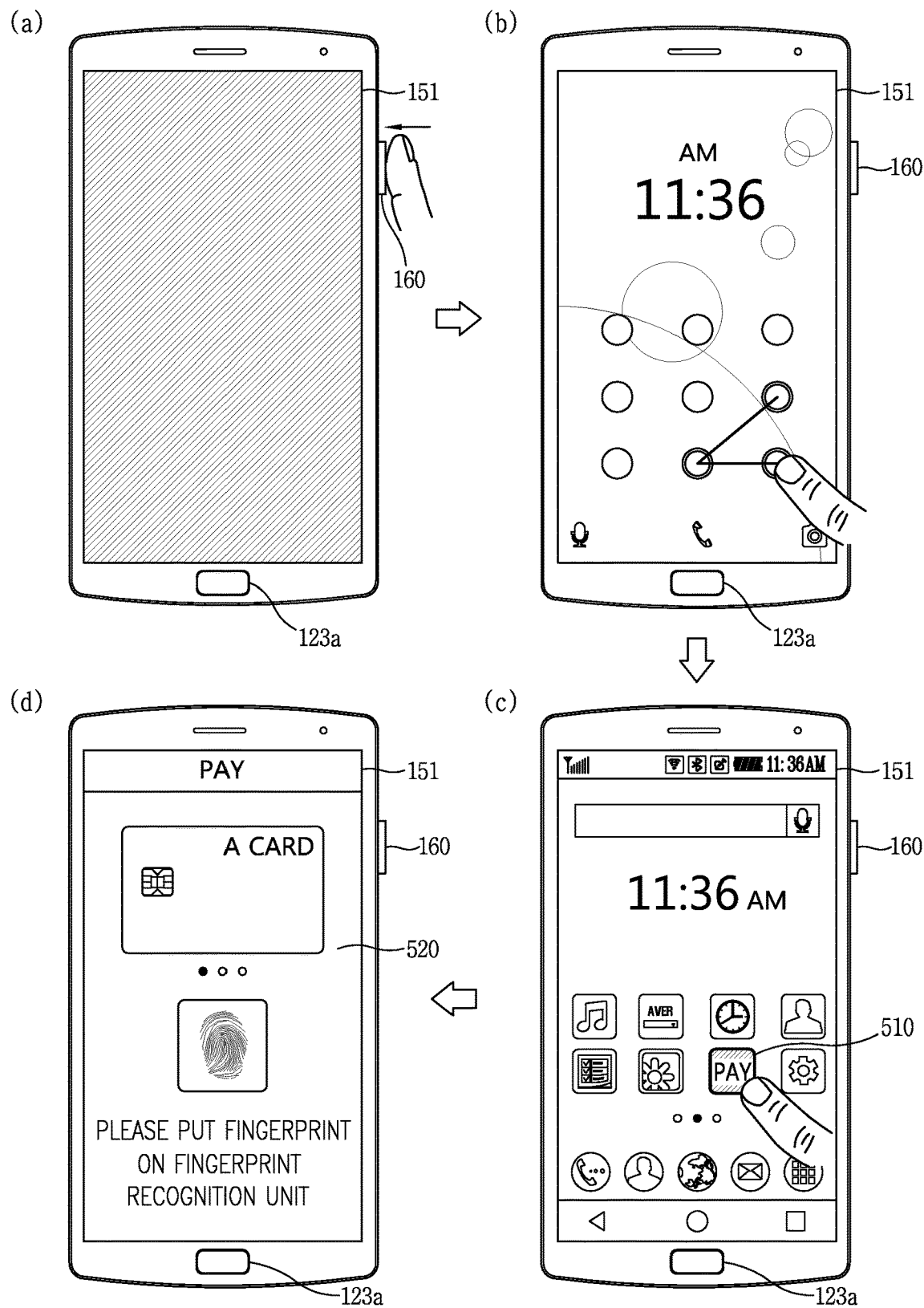
FIGS. 5A and 5B are conceptual diagrams illustrating a method for executing any one of a plurality of operation modes in which different security standards are set when the locked state is switched to the released state.
Figure 5B:
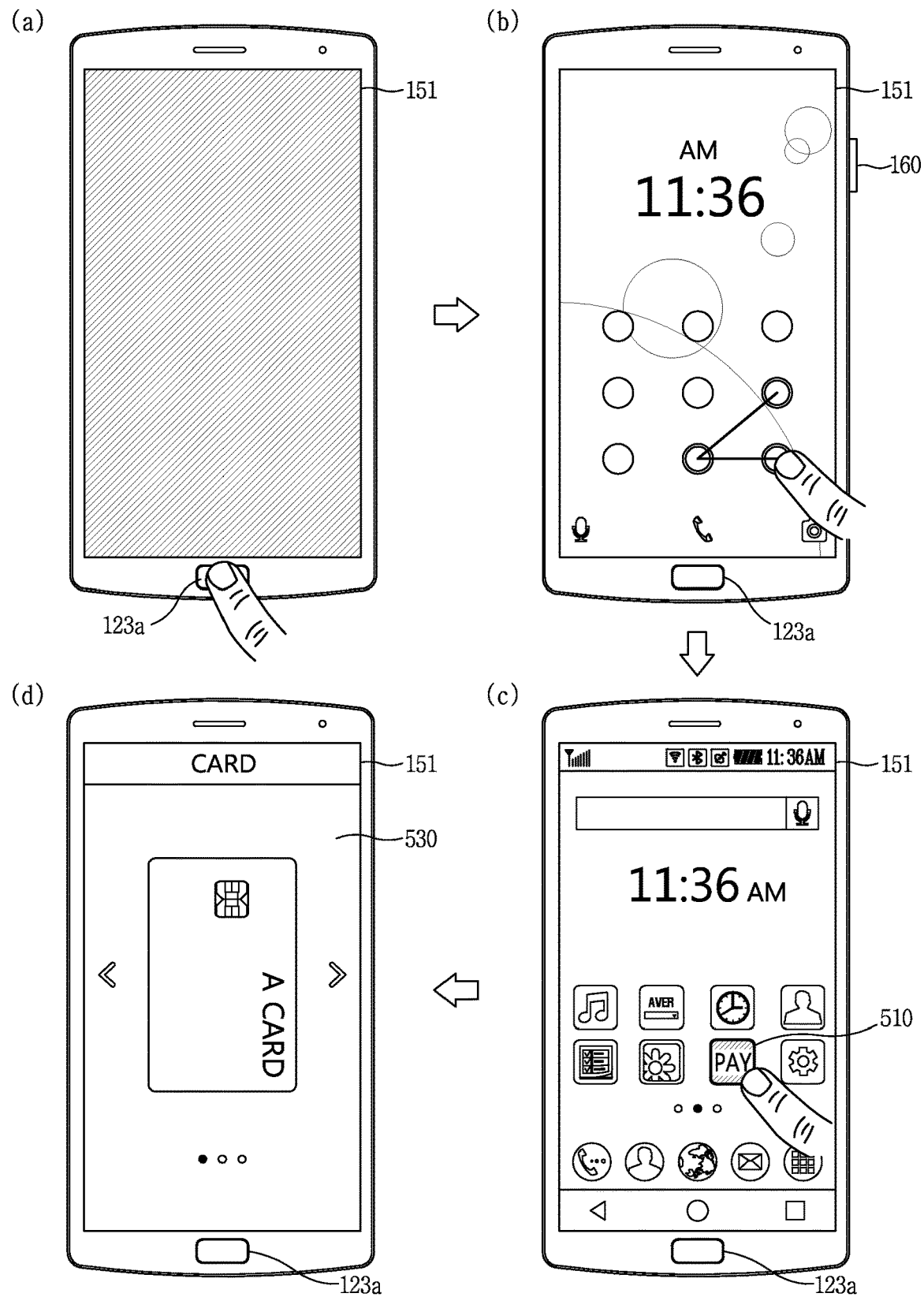

Hereinafter, a method for executing any one of a plurality of operation modes having different security standards when the locked state of the mobile terminal is released will be described. FIGS. 5A and 5B are conceptual diagrams illustrating a method for executing any one of a plurality of operation modes in which different security standards are set when the locked state is switched to the released state.

Different security standards may be set for a plurality of operation modes according to the present invention. Then, the control unit 180 may control the execution state of a function operating in the mobile terminal according to the security standard.

Meanwhile, the artificial intelligence unit 130 according to the present invention may determine (or select) one to be executed in the released state among the plurality of operation modes when the mobile terminal is switched from the locked state to the released state. The locked state is a state in which the operation of the mobile terminal according to a user input is limited, and the released state is a state in which the mobile terminal is able to operate according to a user input.

If preset password information is inputted in the locked state, the control unit 180 may switch the locked state to the released state. At this time, the artificial intelligence unit 130 may monitor the input pattern of a user input applied in the locked state, and predict a function for releasing the locked state as a function to be executed according to the user input pattern.

The artificial intelligence unit 130 may compare the pre-learned usage pattern of a predicted function for releasing the locked state with the input pattern of the monitored user input. Then, based on the comparison result, the control unit 180 may determine any one to be executed in the released state among a plurality of security modes having different security standards.

More specifically, referring to (a) of FIG. 5A, when the lighting of the display unit 151 is turned off, the artificial intelligence unit 130 may turn on the lighting of the display unit 151 in order to display visual information on the display unit 151 in response to a push input applied to the interface unit 160.

Referring to (b) of FIG. 5A, a lock screen indicating a locked state may be displayed on the display unit 151 whose lighting is turned on. An input screen of a lock pattern for releasing the locked state may be included on the lock screen. As shown in (b) of FIG. 5A, when the lock pattern is inputted, the control unit 180 may switch the locked state to the released state.

As shown in (c) of FIG. 5A, the control unit 180 may display a home screen page on the display unit 151 when the locked state is released. When the locked state is switched to the released state, the artificial intelligence unit 130 may determine whether a user who applies a user input has legitimate rights based on the input pattern of the user input applied in the locked state.

More specifically, the artificial intelligence unit 130 may monitor a user input applied in the locked state, such as a user input for turning on the lighting of the display unit 151 and a touch input for inputting a lock pattern. Then, the artificial intelligence unit 130 may predict a function for releasing the locked state as a function to be executed according to the monitored user input.

The artificial intelligence unit 130 may determine whether the monitored user input matches the pre-learned usage pattern of a function for releasing the locked state. The artificial intelligence unit 130 may determine that the user is not a legitimate user when the monitored user input and the pre-learned usage pattern do not match each other. In this case, when the locked state is released, the control unit 180 may execute the second operation mode with a high security standard.

Meanwhile, referring to (c) of FIG. 5A, the control unit 180 may detect that a touch input is applied to an icon 510 of a payment application in the second operation mode. The payment application, as an application for providing a payment function, includes a payment function that requires a high level of security standard. In response to a touch input applied to the icon 510 of the payment application, the control unit 180 may request additional authentication for executing the payment function according to the security standard set in the second operation mode. That is, the control unit 180 may restrict the execution right of the payment application.

In this case, as shown in (d) of FIG. 5A, the control unit 180 may output a screen 520 for requesting additional authentication to the display unit 151. Accordingly, a user may execute the payment function after performing the additional authentication.

Unlike this, the control unit 180 may switch the locked state to the released state according to a user input different from that of FIG. 5A. Referring to (a) and (b) of FIG. 5B, the control unit 180 may turn on the lighting of the display unit 151 according to a touch input to the home key 123a and may switch the locked state to the released state on the basis of the lock pattern entered on the lock screen displayed on the display unit 151. In this case, the artificial intelligence unit 130 may compare the pre-learned usage pattern of a function for releasing the locked state with the input pattern of the user input, thereby determining that a user currently using the mobile terminal is a user with legitimate rights.

As shown in (c) and (d) of FIG. 5B, the control unit 180 may execute the first operation mode continuously and may execute the payment function according to the security standard set in the first operation mode in response to the touch input to the icon 510 of the payment application. Accordingly, a user may execute the payment application without additional authentication.

In the above, the method for determining an operation mode to be executed in the released state when switching the locked state to the released state is described.

Hereinafter, a method for providing a payment service in a mobile terminal including one or more of the above-described components will be described.

The payment service in this specification includes a hardware-based mobile simple payment service, and an application-based simple payment service. Accordingly, the mobile terminal may include hardware for providing a payment service, or an application for providing a payment service may be installed on the memory 170. For example, the mobile terminal may include a magnetic coil for performing payment using a magnetic signal, or include an NFC coil for performing payment using an NFC signal.

Moreover, in recent years, as a payment service using a mobile terminal is provided, the need for security enhancement related to payment in a mobile terminal increases. Accordingly, a mobile terminal according to the present invention proposes a method for learning a payment pattern through the artificial intelligence unit 130 and enhancing the security of payment by utilizing the learned payment pattern.

Figure 6A:
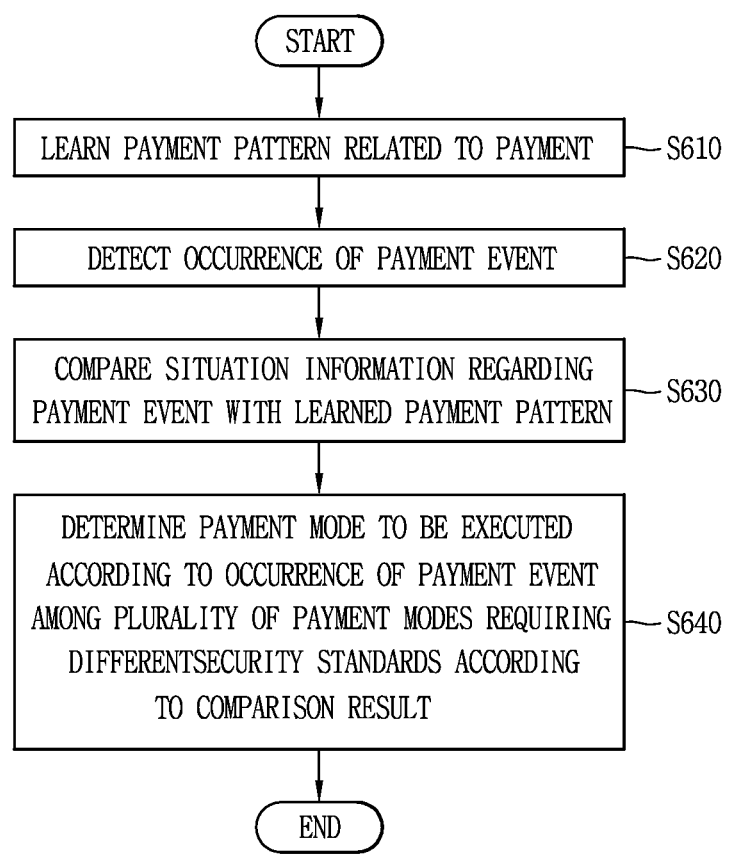
FIG. 6A is a flowchart illustrating a method for enhancing the security of a payment performance using artificial intelligence in a mobile terminal according to the present invention.
Figure 6B:
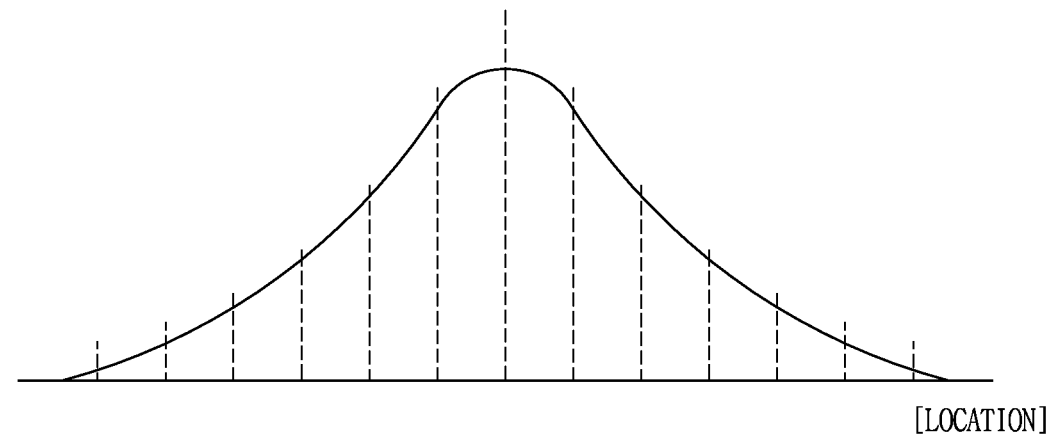
FIG. 6B is a normal distribution graph illustrating a payment pattern generated by an artificial intelligence unit according to the present invention.
Figure 6B:
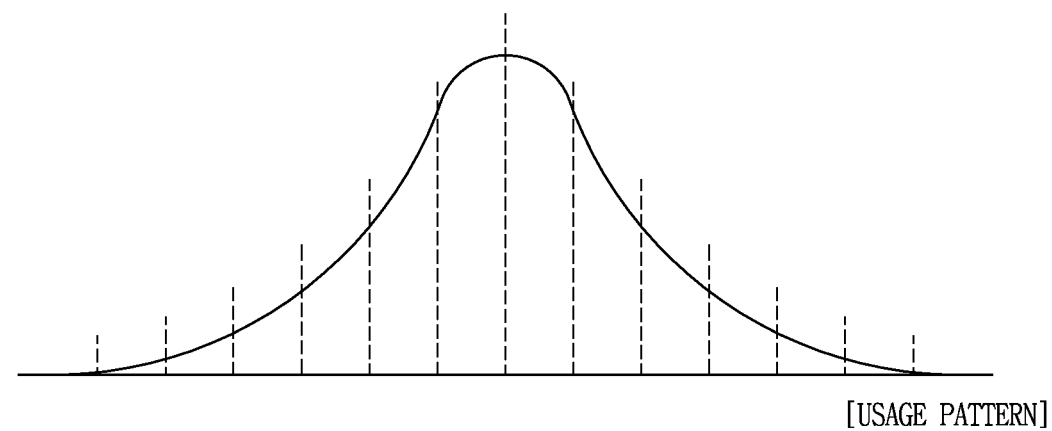
Figure 6B:
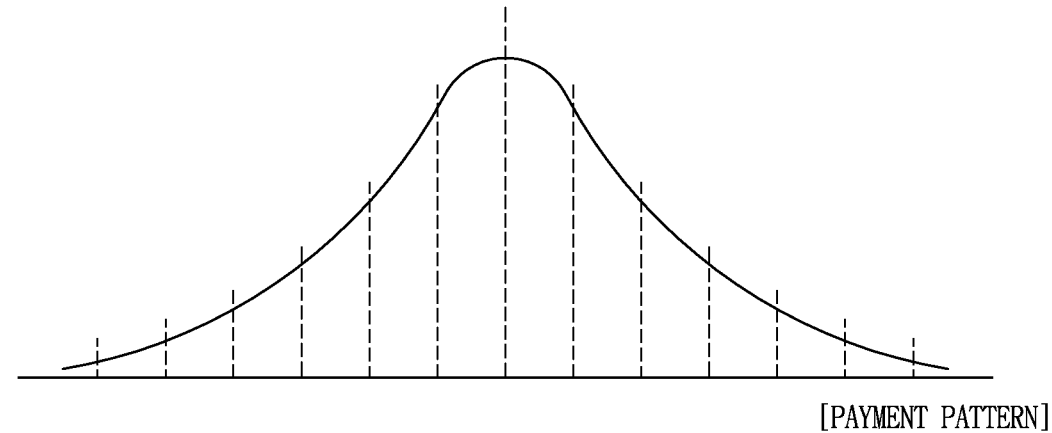

FIG. 6A is a flowchart illustrating a method for enhancing the security of a payment performance using artificial intelligence in a mobile terminal according to the present invention. FIG. 6B is a normal distribution graph illustrating a payment pattern generated by an artificial intelligence unit according to the present invention.

In the following description, although it is described that the artificial intelligence unit 130 operates under the control of the control unit 180, the present invention is not limited thereto, and the control unit 180 may replace the role of the artificial intelligence unit 130 and the artificial intelligence unit 130 may replace the role of the control unit 180.

Referring to FIG. 6A, the artificial intelligence unit 130 may learn a payment pattern related to payment (S610).

The artificial intelligence unit 130 may learn payment related information based on a machine learning technique in order to form a payment pattern of a user having legitimate rights. The user having legitimate rights is used in the same meaning as the user described above with reference to FIG. 2, and thus a detailed description thereof will be omitted.

The payment related information may include information regarding an input pattern of payment related control signals and the surrounding environment of a mobile terminal at the time of payment, and the like.

The input pattern of the payment related control signal may be an input pattern of an inputted control signal of a user input to execute a payment application installed in a mobile terminal or an input pattern of a control signal related to the execution of a payment application.

The information regarding the surrounding environment of the mobile terminal at the time of performing the payment may include location information of the payment, time information of the payment, card information of the payment, payment amount information, payment item information, and the like.

The artificial intelligence unit 130 may collect information regarding payment in order to learn payment related information. More specifically, the artificial intelligence unit 130 may collect information regarding payment through the sensing unit 140, collect control signals related to payment among control signals inputted to or outputted from the components of the mobile terminal, or collect location information regarding payment from a location information unit.

The artificial intelligence unit 130 may extract common components and difference components from information regarding payment based on at least one machine learning technique based algorithm.

For example, if payment is performed more than a predetermined number of times at the same place, the artificial intelligence unit 130 may extract the same place information as a common component.

As another example, if the artificial intelligence unit 130 detects more than a predetermined number of times that the same item is paid within a specific time at a specific place, the artificial intelligence unit 130 may identify a specific item (e.g., bottled water) in a specific place (e.g., supermarket) at a specific time (e.g., 19:00) as common components.

As another example, if a control signal for executing the payment application is repeated more than a predetermined number of times in the same input order, the artificial intelligence unit 130 may extract the control signal and the input order thereof as common components.

Then, the artificial intelligence unit 130 may calculate a probability corresponding to a payment situation by a user having legitimate rights for each extracted common component, based on at least one predetermined algorithm.

For example, as shown in (a) of FIG. 6B, the artificial intelligence unit 130 may generate a normal distribution graph indicating a probability corresponding to a payment situation by a user having legitimate rights at each place. As another example, as shown in (b) of FIG. 6B, a normal distribution graph may be generated, which indicates a probability corresponding to a payment situation by a user having legitimate rights for each input pattern of payment related control signals.

The artificial intelligence unit 130 may form a payment pattern of a user having legitimate rights by using the information regarding the learned payment. The payment pattern may be understood as a payment habit, a payment characteristic, a payment style, and a payment method for a user who performs payment.

More specifically, the artificial intelligence unit 130 may assign different weights to the respective common components based on an algorithm that assigns different weights to the respective common components. Then, the artificial intelligence unit 130 may form a payment pattern by combining the common components having the different assigned weights. The weight, as a value indicating importance for each information, may be set according to a learning result by machine learning or may be set in advance according to an algorithm.

For example, the AI 130 the artificial intelligence unit 130 may assign different weights to the average value of the normal distribution graph (see (a) of FIG. 6B) for a place and the average value of the normal distribution graph (see (b) of FIG. 6B) for a payment related control command, based on the weight algorithm, and form a payment pattern by combining the average values having the different assigned weights.

Meanwhile, the present invention is not limited to the weight algorithm, but a payment pattern may be generated by using various algorithms described with reference to FIG. 1 in addition to the weight assigning algorithm.

The payment pattern formed by the artificial intelligence unit 130 may be formed as a normal distribution graph as shown in (c) of FIG. 6B. The artificial intelligence unit 130 may determine that the probability of a normal payment situation is higher as it is closer to the average value of the normal distribution graph representing the payment pattern. Here, the normal payment situation is a situation where a user having legitimate rights generates a payment event.

The artificial intelligence unit 130 may determine that the probability of a normal payment situation is lower as it is farther away from the average value of the normal distribution graph representing the payment pattern. In other words, the artificial intelligence unit 130 may determine that the probability of a normal payment situation is lower as it is closer to Six Sigma (6σ) in the normal distribution graph representing the payment pattern. Here, the abnormal payment situation is a situation where a user without legitimate rights generates a payment event. The sigma is the standard deviation of the normal distribution graph and the Six Sigma, as a value corresponding to 6 standard deviations in the normal distribution graph, represents a probability of 0.002/1000000. That is, when the probability representing the payment pattern corresponds to the above-mentioned Six Sigma, it may be understood that the probability of a normal payment situation corresponds to zero.

Meanwhile, the artificial intelligence unit 130 may update the payment pattern when information regarding a new payment is collected. Through this, the present invention may improve the accuracy of determining whether payment is performed by a user having legitimate rights.

The payment pattern may be stored in the memory 170 or may be stored as a personalized database in an external storage available for communication connection.

Referring to FIG. 6A again, the control unit 180 may detect occurrence of a payment event (S620).

The payment event may be an event related to payment. For example, a payment event may be an event in which a user inputs authentication information for performing a payment. As another example, a payment event may be an event in which a payment application is executed. As another example, a payment event may be an event in which a payment request for payment is received from an external device.

Unless otherwise specified in the following description, it is assumed and described that a payment event is an event in which a user inputs authentication information in order to perform a payment. However, the present invention is not limited to an event for inputting authentication information, but may be identically or similarly applied to a situation in which various events related to payment occur.

When the payment event occurs, the artificial intelligence unit 130 may compare situation information regarding the payment event with the learned payment pattern (S630).

The situation information regarding a payment event is information regarding the payment collected at the time of occurrence of the payment event. For example, the situation information regarding the payment event may include input pattern information in which a user input related to a payment event function is inputted, location information of a mobile terminal at the time of occurrence of the payment event, payment amount information, payment item information, and the like.

The artificial intelligence unit 130 may monitor situation information regarding the payment event in the background. Then, when a payment event occurs, in order to determine whether the occurrence of the payment event is a normal payment situation, the artificial intelligence unit 130 may compare the monitored situation information with the pre-learned payment pattern representing a payment pattern of a user having legitimate rights.

As a result of comparison, if the pre-learned payment pattern and the monitored situation information match each other, the artificial intelligence unit 130 may determine that the payment event occurs in a normal payment situation. On the contrary, if the pre-learned payment pattern and the monitored situation information do not match each other, the artificial intelligence unit 130 may determine that the payment event occurs in an abnormal payment situation.

Meanwhile, the artificial intelligence unit 130 may calculate whether the pre-learned payment pattern matches the monitored situation information as a probability. More specifically, the artificial intelligence unit 130 may calculate a probability of determining whether a situation in which a payment event occurs is a normal payment situation by using a normal distribution graph indicating a payment pattern.

Various algorithms may be used to calculate the probability. For example, the artificial intelligence unit 130 may convert the monitored situation information into a specific value based on a predetermined algorithm. Such an algorithm is a statistical algorithm, and may be an algorithm for calculating a specific value by assigning different weights to the attribute values included in the situation information.

Then, the artificial intelligence unit 130 may compare the specific value representing the monitored situation information with the normal distribution graph representing the payment pattern, if the specific value is close to the average value of the normal distribution graph, determine that the probability of a normal payment situation is high, and if the specific value is away from the average value of the normal distribution graph, determine that the probability of a normal payment situation is low.

Accordingly, if the calculated probability is equal to or higher than the predetermined level, the artificial intelligence unit 130 may determine that the payment is normal, and if the calculated probability is less than the predetermined level, determine that the payment is abnormal.

The control unit 180 may determine a payment mode to be executed according to the occurrence of a payment event among a plurality of payment modes requiring different security standards, based on the comparison result (S640).

When a payment event occurs, the control unit 180 may control the artificial intelligence unit 130 to determine a payment mode to be executed according to the payment event.

The artificial intelligence unit 130 may determine a payment mode to be executed in response to the payment event among a plurality of payment modes having different security standards required for the payment performance, based on the comparison result. Specifically, the artificial intelligence unit 130 may execute the first payment mode in a normal payment situation and may execute a second payment mode in an abnormal payment situation.

The plurality of payment modes may be preset. More than one such payment mode may be set. Hereinafter, a plurality of payment modes will be described with reference to a first payment mode and a second payment mode. However, the present invention is not limited thereto, and there may be three or more payment modes with different security standards.

The first payment mode is a mode for performing payment based on a security standard required in a normal payment situation. That is, the first payment mode is a mode to be executed when a user who generates a payment event is determined as a user with legitimate rights. For example, in the first payment mode, payment may be performed using a payment password having a low security level.

The first payment mode may be a reference mode. The reference mode is a mode set to be executed by default, regardless of whether or not a user who inputs the execution command of the payment application is a legitimate user, when the execution command of the payment application is applied.

The second payment mode is a mode for performing payment based on a security standard required in an abnormal payment situation. That is, the second payment mode is a mode to be executed when a user who generates a payment event is determined as a user without legitimate rights. Accordingly, the security standard of the second payment mode may require a security payment that is higher than the security payment of the first payment mode.

In the second payment mode requiring a high level of security standard, biometric information of a user with a high security level may be requested as authentication information. For example, in the second payment mode, face information, iris information, fingerprint information, voice information, heart rate information, and the like may be requested as authentication information. In addition to the biometric information of a user, the second payment mode may require a payment password, a currency, an authorized certificate, an OTP, or the like as authentication information. The authentication information in the second payment mode may be set in advance by a provider providing a payment function or may be manually set by a user.

The second payment mode may be a payment mode for performing payment by using authentication information that satisfies a security standard that is higher than a security standard required in the first payment mode in addition to authentication information that satisfies the security standard required in the first payment mode, that is, two authentication information. For example, the second payment mode may be a mode in which payment is performed using both the payment password requested in the first payment mode and fingerprint information having a higher security standard than the payment password.

In addition, the second payment mode may be a payment mode for performing payment by using only authentication information that satisfies a security standard required in the second payment mode instead of authentication information that satisfies a security standard required in the first payment mode. For example, in the second payment mode, the payment may be performed using the iris information having high security level instead of the payment password required in the first payment mode. When requesting the iris information, the mobile terminal may further include an infrared camera for iris recognition, and the artificial intelligence unit 130 may analyze the image photographed through the infrared camera based on a predetermined algorithm to perform iris recognition.

The control unit 180 may execute the payment mode determined by the artificial intelligence unit 130 in response to the occurrence of the payment event. When the authentication information required in the determined payment mode is inputted, the control unit 180 may perform a payment based on the inputted authentication information.

If the payment approval is made in the second payment mode, the artificial intelligence unit 130 may monitor the situation information regarding the payment for a predetermined time after the payment approval is made. Then, the artificial intelligence unit 130 may cancel the approved payment based on the monitored situation information.

For example, the artificial intelligence unit 130 may extract the situation information based on the voice if a voice of "payment is wrong" is received from sound information received for a predetermined time. Then, the artificial intelligence unit 130 may determine that the payment is made incorrectly, and transmit a control command for canceling the payment to a payment server. Therefore, the present invention may enhance the security in the second payment mode.

Meanwhile, the artificial intelligence unit 130 may switch the payment mode based on the monitored situation information.

For example, when the first payment mode is executed and a payment event occurs, the artificial intelligence unit 130 may compare the learned payment pattern with situation information regarding the payment event. Then, the artificial intelligence unit 130 may determine whether to switch the payment mode based on the comparison result.

More specifically, the artificial intelligence unit 130 may not switch the payment mode when the learned payment pattern matches the situation information regarding the payment event. On the contrary, when the learned payment pattern does not match the situation information regarding the payment event, the artificial intelligence unit 130 may switch the payment mode. For example, the artificial intelligence unit 130 may determine switching to the second payment mode during execution of the first payment mode. In the same manner, the artificial intelligence unit 130 may determine switching to the first payment mode during execution of the second payment mode.

That is, even after the payment mode is determined, the present invention may change the payment mode using the payment related situation information.

Meanwhile, although not shown in the drawing, if it is determined that payment is in an abnormal payment situation, the artificial intelligence unit 130 may control the control unit 180 to transmit notification information to a predetermined external terminal. More specifically, when a specific phone number set to contact a user in an abnormal payment situation is stored, the control unit 180 may transmit a text message or a call signal in an abnormal payment situation to inform that there is an abnormal payment attempt.

In the above, a method for enhancing the security of payment by changing a security level based on situation information regarding the execution of the payment when executing a payment function is described. Through this, the present invention may prevent the abnormal payment from being performed by increasing the security level of the authentication method in an abnormal payment situation.

Figure 7A:
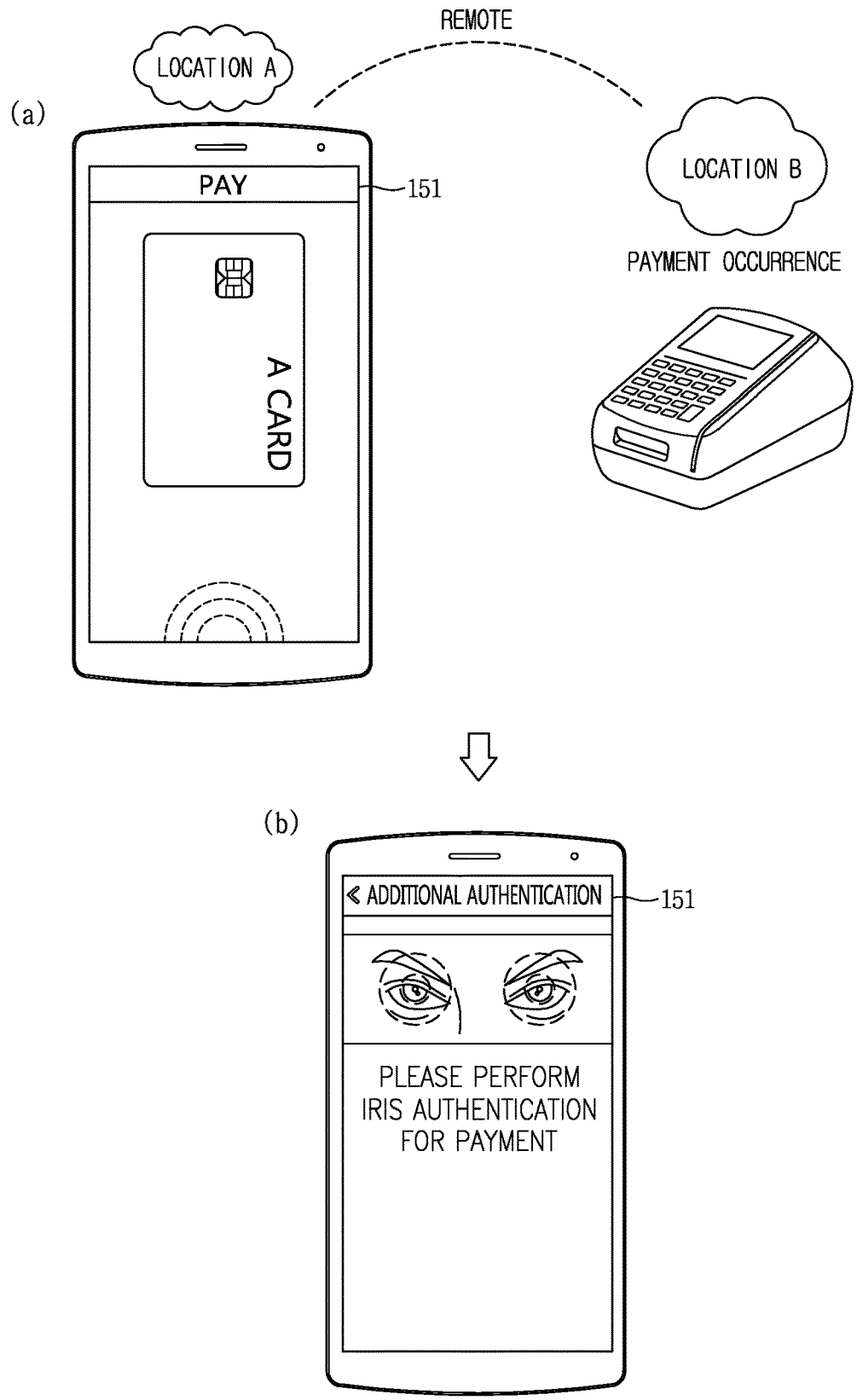
FIGS. 7A to 7C are conceptual diagrams illustrating a method for determining a payment mode based on at least one of position and time information.
Figure 7B:
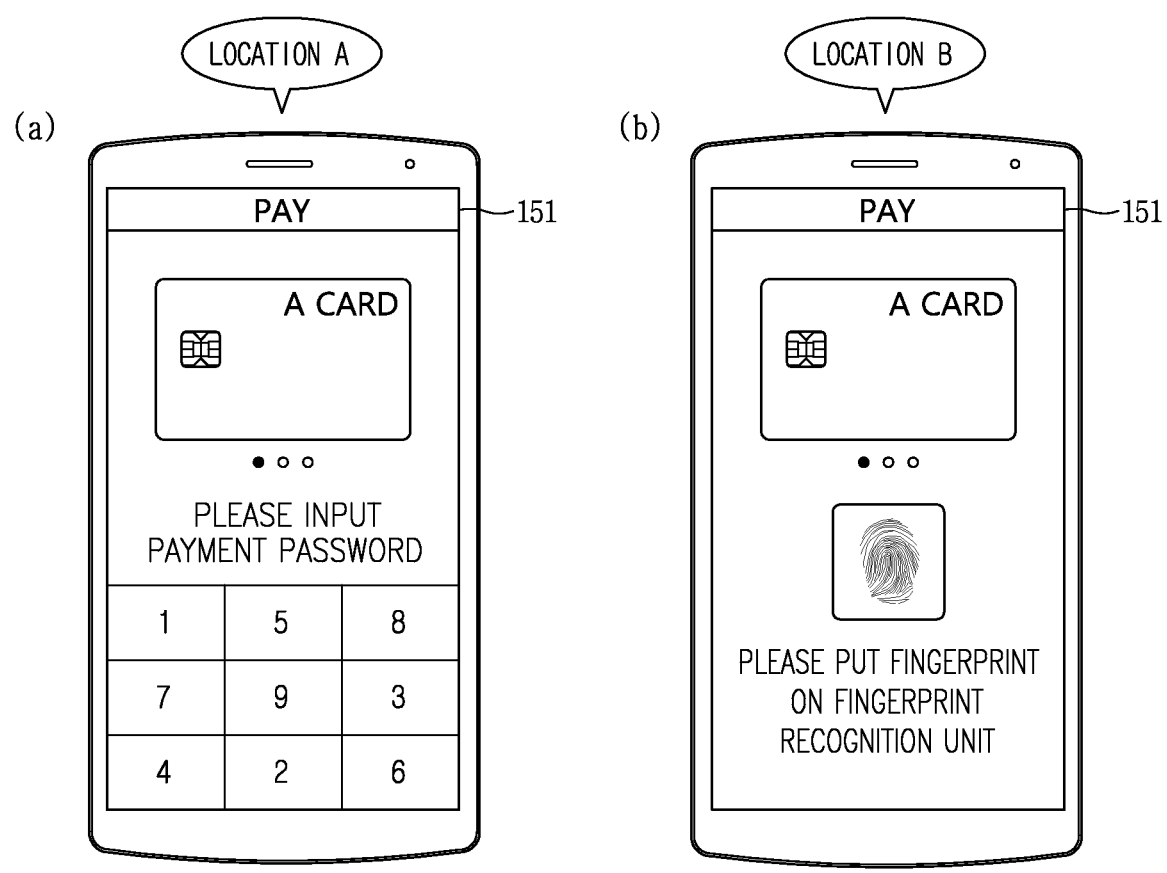
Figure 7C:
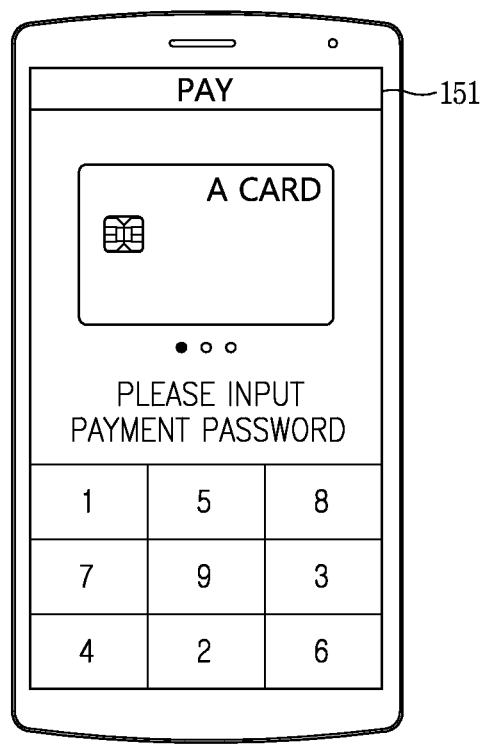
Figure 7C:
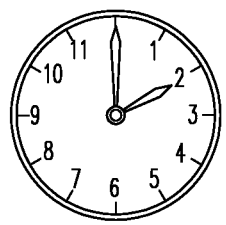
Figure 7C:
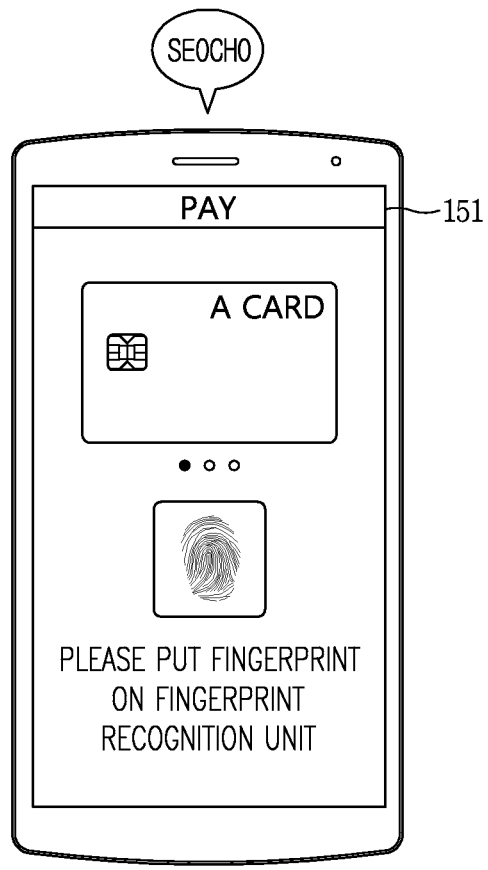

Hereinafter, a method for determining a payment mode based on at least one of location and time information will be described. FIGS. 7A to 7C are conceptual diagrams illustrating a method for determining a payment mode based on at least one of location and time information.

First, the control unit 180 according to the present invention may detect occurrence of a payment event. For example, the control unit 180 may detect occurrence of a payment event in which authentication information for performing payment is inputted.

The artificial intelligence unit 130 may monitor situation information regarding a payment event in response to a payment event occurrence. For example, as shown in FIG. 7A, the artificial intelligence unit 130 may collect the current location information (location A: overseas) of a user at the time at which a payment event is to occur and location information (location B: domestic) on a location where payment is to be performed. At this time, the artificial intelligence unit 130 may monitor situation information that the current location (location A: overseas) of the user is very far away from the location (location B: domestic) where payment is to be performed.

The location (location B) where payment is to be performed may be a location where an external device for receiving the authentication information from the mobile terminal and transmitting the authentication information to the payment server is installed. Such an external device may be a POS device. The location of the POS device may be received from a payment server.

Here, the payment server, as an external server for processing or storing payment information, may be a server for transmitting and receiving information regarding payment to and from the mobile terminal and the POS device through communication. The payment server may be a server provided by a credit card company or a bank.

The artificial intelligence unit 130 may compare the monitored situation information with the pre-learned payment pattern and determine whether the monitored situation information is a normal payment situation based on the comparison result.

For example, in a situation that the location information of the user included in the monitored situation information is very different from the location information on a location where payment is to be performed, the artificial intelligence unit 130 may determine that the payment is abnormal. That is, the artificial intelligence unit 130 may determine that an abnormal payment situation occurs when a payment event occurs at a location where the current user is not able to generate a payment event.

If the monitored situation information is determined as an abnormal payment situation through the artificial intelligence unit 130, the control unit 180 may execute the second payment mode having a high security level. In the second payment mode, iris information having high security level authentication information may be requested. For example, as shown in (b) of FIG. 7A, screen information for iris authentication may be outputted on the display unit 151.

When iris information is inputted, the control unit 180 may perform a payment based on the iris information. Therefore, even in an abnormal payment situation, when the authentication information having high security level is correctly authenticated, the control unit 180 allows payment to be possible, so that the security of the payment and the easiness of payment may be obtained at the same time.

Alternatively, as shown in (a) and (b) of FIG. 7B, the artificial intelligence unit 130 compares the location (location B) where the monitored payment is to be performed and the location (location A) included in the pre-learned payment pattern, thereby determining whether it is a normal payment situation.

For example, as shown in (a) of FIG. 7B, when the location (location A) included in the pre-learned payment pattern matches the monitored location information, the artificial intelligence unit 130 may determine that it is a normal payment situation. In such a case, the control unit 180 may execute the first payment mode. Alternatively, as shown in (b) of FIG. 7B, if the location (location A) included in the pre-learned payment pattern differs from the monitored location information, the artificial intelligence unit 130 may determine that the payment is abnormal. In such a case, the control unit 180 may execute the second payment mode.

Therefore, the present invention may improve the convenience of a user by performing payment through a payment method according to a low level of security at a location where payment is frequently performed, and enhance the payment security by performing payment in a payment method according to a high level of security at a location where payment is not frequently performed.

In addition, the artificial intelligence unit 130 may determine whether payment is in a normal payment situation by comparing the predicted location where it is predicted that a user is to be located with a location where an actual payment is performed at the current time according to the previously stored schedule information.

For example, as shown in the table of FIG. 7C, the schedule information may include time information and location information, that is, "Seocho" between 10:00 and 12:00 and "Gasan" between 13:00 and 15:00. At this time, as shown in (a) of FIG. 7C, when a payment event occurs in "Gasan" at 2:00, the artificial intelligence unit 130 may determine that it is a normal payment situation to execute the first payment mode, and as shown in (b) of FIG. 7C, when a payment event occurs in 'Seocho' at 2:00, determine that it is an abnormal payment situation to execute the second payment mode.

Therefore, the present invention may predict the location of a user by utilizing schedule information without using the current location of the user, and determine whether a payment event occurs in a normal payment situation by utilizing the predicted location. Therefore, the present invention may prevent payment in an abnormal payment situation.

In the above, a method for executing a payment mode according to location information and time information by utilizing artificial intelligence is described.

Figure 8A:
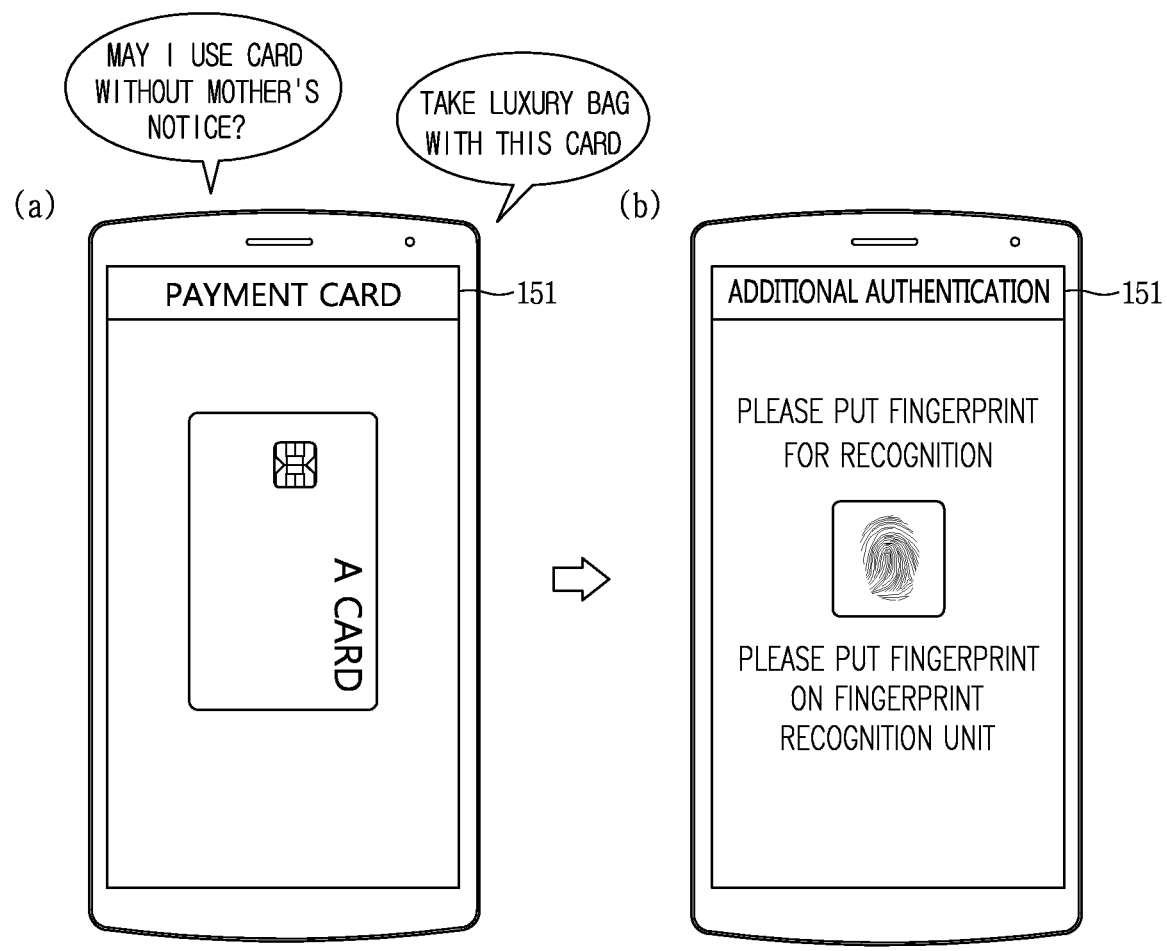
FIG. 8A is an embodiment for detecting situation information on the surrounding environment by using a microphone and determining a payment mode according thereto.
Figure 8B:
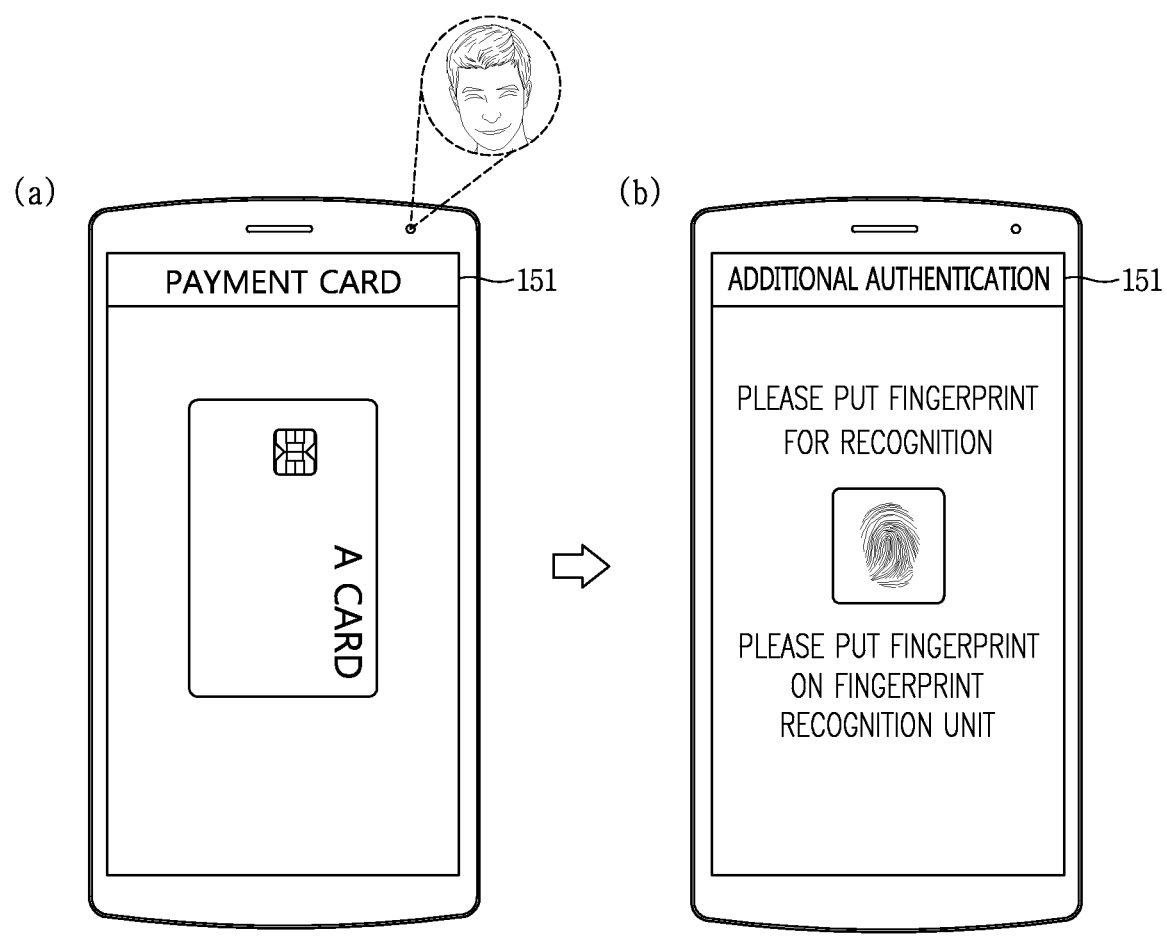
FIG. 8B is an embodiment for detecting situation information on the surrounding environment by using a camera and determining a payment mode according thereto.
Figure 8C:
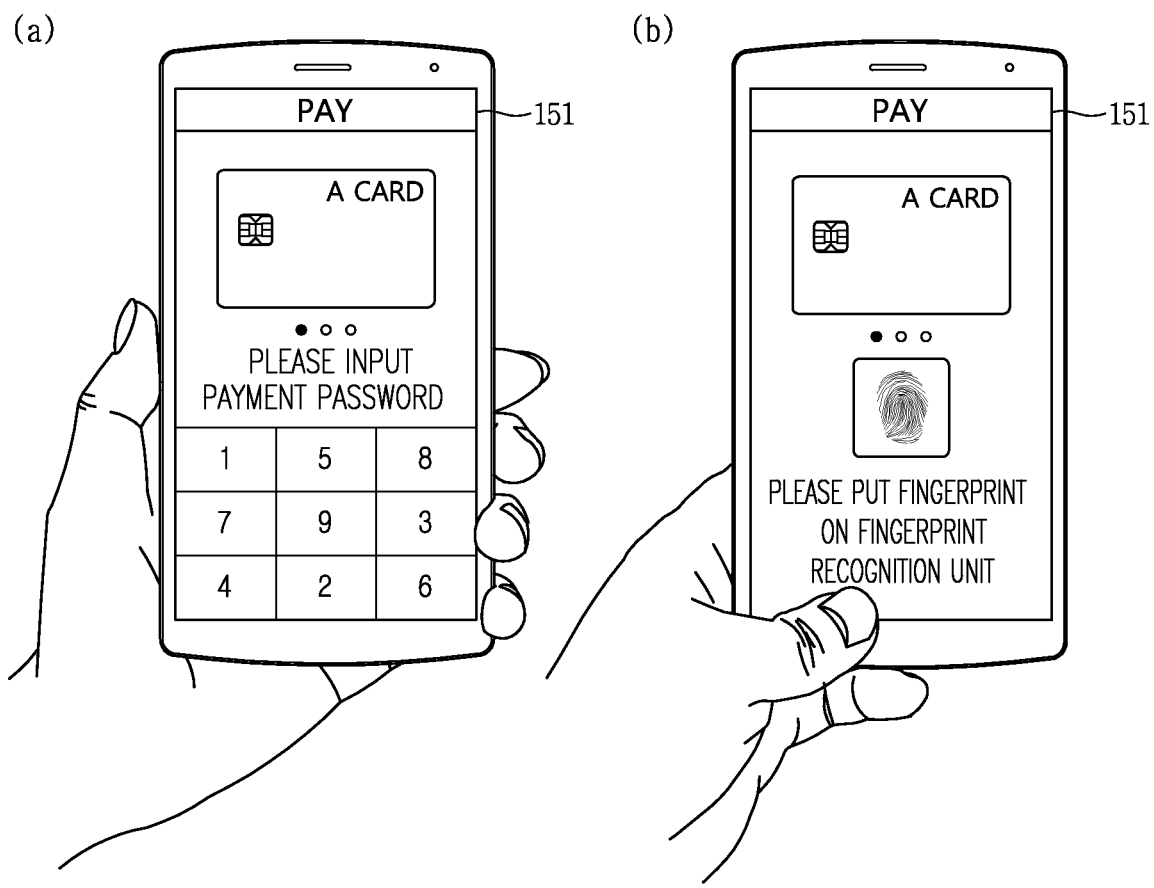
FIG. 8C is an embodiment for detecting situation information on the surrounding environment by using a grip sensor and determining a payment mode according thereto.

Hereinafter, a method for detecting situation information on the surrounding environment using a sensor and determining a payment mode using the detection will be described. FIG. 8A is an embodiment for detecting situation information on the surrounding environment by using a microphone and determining a payment mode according thereto. FIG. 8B is an embodiment for detecting situation information on the surrounding environment by using a camera and determining a payment mode according thereto. FIG. 8C is an embodiment for detecting situation information on the surrounding environment by using a grip sensor and determining a payment mode according thereto.

The artificial intelligence unit 130 according to the present invention may monitor situation information on the surrounding environment of a mobile terminal by using various sensors provided in the mobile terminal. Such sensors may include a camera that senses visual information, a microphone that senses auditory information, a tactile sensor that senses tactile information, and an olfactory sensor that senses olfactory information.

The artificial intelligence unit 130 may drive these sensors in the background in real time. That is, the sensors may always detect at least one of the visual, auditory, tactile, and olfactory information in the background in real time. Such a driving method may also be referred to as an always-on driving method.

The artificial intelligence unit 130 may monitor situation information based on the sensing information received from the sensors. Then, the monitored situation information may be compared with the pre-learned payment pattern to determine whether or not the payment situation is normal.

For example, referring to FIG. 8A, the artificial intelligence unit 130 may monitor situation information based on auditory information received through a microphone. As shown in (a) of FIG. 8A, the artificial intelligence unit 130 may receive auditory information such as "May I use a card without a mother's notice?", "Take a luxury bag with this card", and the like. The artificial intelligence unit 130 may analyze the auditory information based on a predetermined speech recognition algorithm.

Then, the artificial intelligence unit 130 may determine situation information regarding a payment event based on the analyzed auditory information. For example, the artificial intelligence unit 130 may monitor situation information indicating a situation in which a user without legitimate rights attempts to make a payment based on the analyzed auditory information.

The artificial intelligence unit 130 may compare the monitored situation information with the pre-learned payment pattern. As a result of the comparison, if it is determined that the monitored situation information is not a normal payment situation, the artificial intelligence unit 130 may determine a payment mode to be executed as the second payment mode in response to the occurrence of the payment event. Then, the control unit 180 may execute the second payment mode in response to the occurrence of the payment event.

For example, as shown in (b) of FIG. 8A, in response to the occurrence of a payment event, the control unit 180 may execute the second payment mode for requesting fingerprint information instead of the first payment mode for requesting a payment password. Therefore, the present invention may prevent inappropriate payment attempts by increasing the security level of authentication related to payment in an abnormal situation.

Also, although not shown in the drawing, the artificial intelligence unit 130 may compare the voice information of a user included in the pre-learned payment pattern with the voice information at the time of occurrence of the payment event so as to determine whether the user attempting payment has legitimate rights. Then, based on the determination result, if the voice information of the user included in the payment pattern and the voice information at the time of the payment event match each other, the control unit 180 may execute the first payment mode, and if the voice information of the user included in the payment pattern and the voice information at the time of the payment event do not match each other, execute the second payment mode.

In addition, referring to FIG. 8B, the control unit 180 may capture an image of the surrounding environment of the mobile terminal through the camera 121, and may deliver the captured image to the artificial intelligence unit 130. The artificial intelligence unit 130 may analyze the captured image based on a predetermined image analysis algorithm and monitor situation information regarding payment based on the analysis result.

More specifically, the artificial intelligence unit 130 may obtain the face information of a user who generates the payment event based on the analysis result of analyzing the image. Then, the artificial intelligence unit 130 may compare the obtained face information with the face information included in the pre-learned payment pattern and based on the comparison result, determine whether it is a normal payment situation.

For example, if the face information of the user matches the face information included in the pre-learned payment pattern, the artificial intelligence unit 130 may determine that it is in a normal payment situation.

In addition, the artificial intelligence unit 130 may extract emotion information from the user's face information and determine whether or not it is in a normal payment situation state based on the extracted emotion information. For example, if it is determined that the extracted user's emotional information is irritable or unstable, the artificial intelligence unit 130 may determine that it is in an abnormal payment situation, and if it is determined that the extracted user's emotion information is calm or happy, determine that it is in a normal payment situation.

If the monitored situation information determines that a user who attempts to make a payment is a user with legitimate rights through the artificial intelligence unit 130, the control unit 180 may execute the second payment mode requiring fingerprint information in response to a payment event.

In addition, referring to FIG. 8C, the control unit 180 may monitor the shape of the user's hand holding the main body through the grip sensor. The artificial intelligence unit 130 may determine whether a user holding the current mobile terminal is a user with legitimate rights based on the shape of the hand of the user included in the pre-learned payment pattern and the shape of the hand of the currently monitored user.

As shown in (a) of FIG. 8C, when the shape of the hand of the user monitored through the grip sensor matches the shape of the hand included in the pre-learned payment pattern, the artificial intelligence unit 130 may determine that the user is a user with legitimate rights. In such a case, the control unit 180 may execute the first payment mode in response to a payment event.

As shown in (b) of FIG. 8C, when the shape of the hand of the user monitored through the grip sensor is different from the shape of the hand included in the pre-learned payment pattern, the artificial intelligence unit 130 may determine that the user is not a user with legitimate rights. In such a case, the control unit 180 may execute the second payment mode requiring fingerprint information in response to the payment event.

Moreover, if it is determined that the situation information determined in FIGS. 8A to 8C is a normal payment situation in which a real user attempts to make a payment, the artificial intelligence unit 130 may deliver a control command to the control unit 180 to execute the first payment mode requesting authentication information according to a low level of security.

As described above, the present invention monitors situation information in real time and determines a payment mode by using it, so that in a normal payment situation, it is possible to make a payment only with an input of low security simple authentication information and in an abnormal payment situation, it is possible to make a payment only with an input of high security authentication information.

Figure 9B:
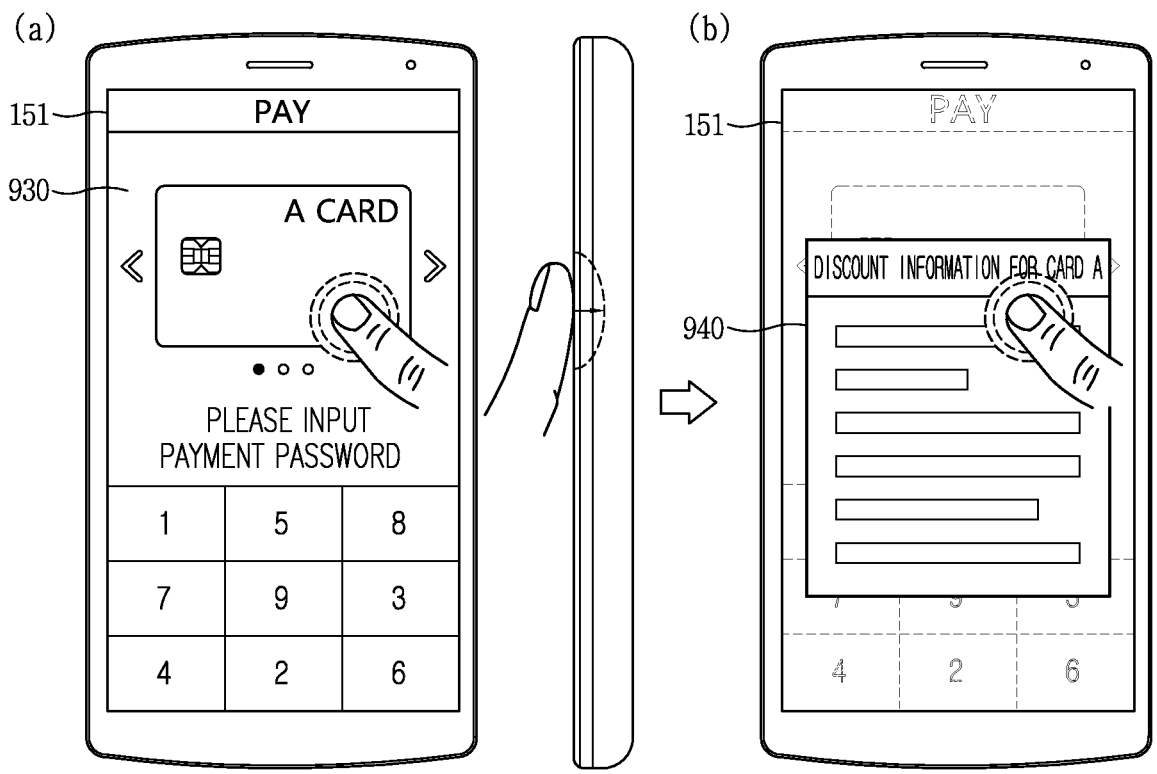
FIG. 9B is a conceptual diagram illustrating an embodiment for determining a payment mode according to a pressure of a force touch.
Figure 9B:
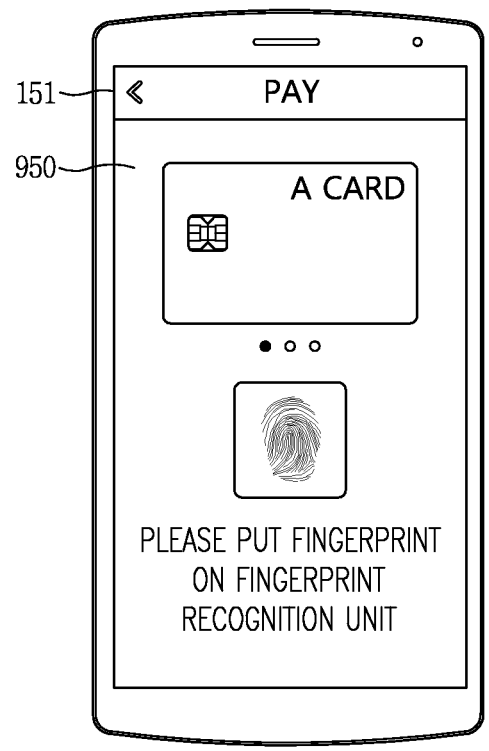
Figure 9C:
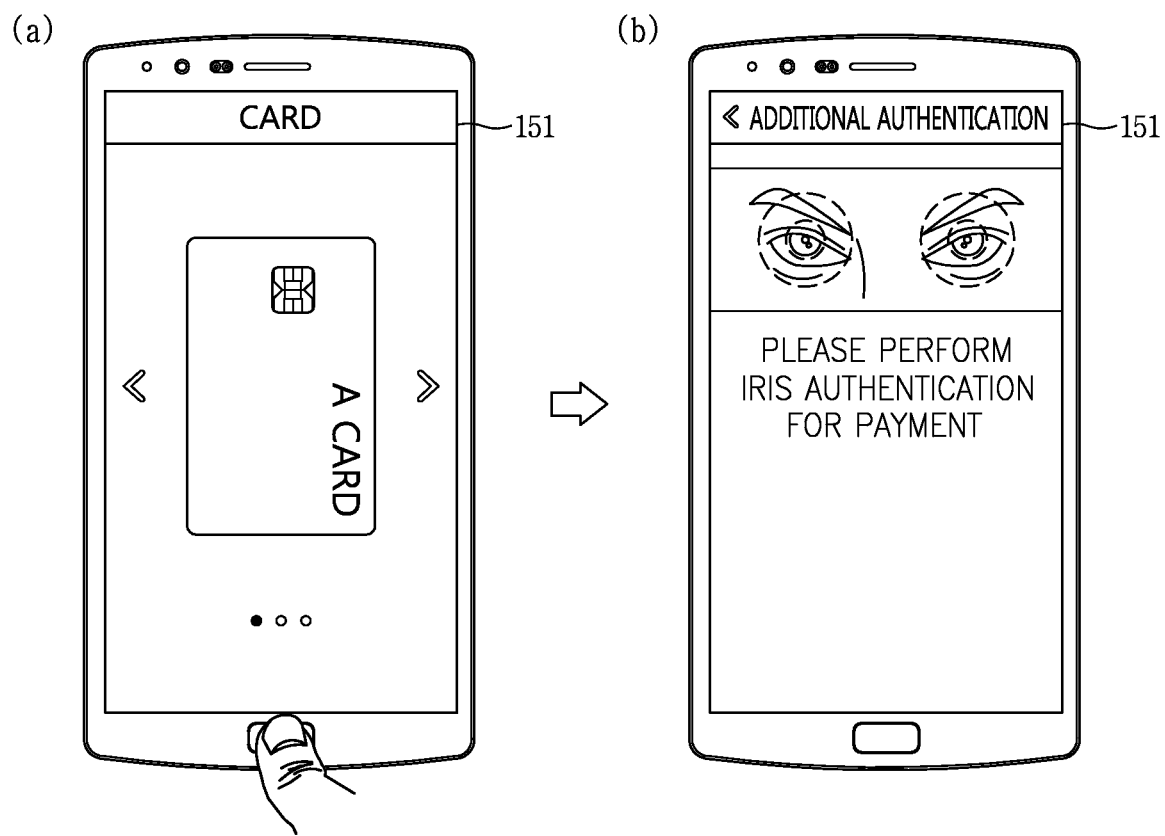
FIG. 9C is a conceptual diagram illustrating an embodiment for determining a payment mode according to a finger for inputting fingerprint information.

Hereinafter, a method for determining a payment mode according to an input pattern of a user control signal will be described. FIG. 9A is a conceptual diagram illustrating an embodiment for determining a payment mode according to an input pattern of a user input for executing a payment function, and FIG. 9B is a conceptual diagram illustrating an embodiment for determining a payment mode according to a pressure of a force touch. FIG. 9C is a conceptual diagram illustrating an embodiment for determining a payment mode according to a finger for inputting fingerprint information.

Referring to FIG. 9A, the artificial intelligence unit 130 may determine whether or not situation information regarding a payment event is a normal payment situation, based on an input pattern of a user input for executing a payment function.

More specifically, the artificial intelligence unit 130 may monitor an input pattern of a touch input for executing a payment application. For example, as shown in (a) of FIG. 9A, when the touch input is applied to the icon 910 of the payment application included in the home screen page, the artificial intelligence unit 130 may monitor the pressure and area of the touch input as an input pattern.

Unlike this, as shown in (c) and (d) of FIG. 9A, the artificial intelligence unit 130 may monitor a direction in which drag inputs 920a and 920b for searching for an icon of a payment application on a menu screen including a plurality of icons installed on the mobile terminal are applied and the number of drag inputs, as an input pattern.

When the input pattern at the time that a payment event is to occur matches the input pattern included in the payment pattern, the artificial intelligence unit 130 may determine that it is in a normal payment situation. In such a case, the control unit 180 may execute the first payment mode. On the contrary, when the input pattern at the time that the payment event is to occur does not match the input pattern included in the payment pattern, the artificial intelligence unit 130 may determine that it is in an abnormal payment situation. In such a case, the control unit 180 may execute the second payment mode.

For example, as shown in (b) of FIG. 9A, when an input pattern for applying a touch input to the icon 910 of the payment application included in the home screen page matches a touch pattern included in a payment pattern, the artificial intelligence unit 130 may monitor that it is in a normal payment situation. In such a case, the control unit 180 may execute the first payment mode.

Unlike this, as shown in (e) of FIG. 9A, when the direction and number of drag inputs for searching for the icon 910 of the payment application included on the home screen page does not match an input pattern included in a payment pattern, the artificial intelligence unit 130 may determine that it is in an abnormal payment situation and execute the second payment mode. Here, the drag input for searching for the icon 910 of the payment application is a drag input inputted to a display unit before a touch input is applied to the icon 910 of the payment application.

That is, the present invention distinguishes whether a user who generates a payment event on a mobile terminal is a user with legitimate rights by using an input pattern related to the occurrence of the payment event, and interferes with a payment attempt of a user without legitimate rights, thereby enhancing the payment security.

In addition, referring to FIG. 9B, when the touch attribute of the touch input applied to the execution screen of the payment application is different from the touch attribute included in the payment pattern, the artificial intelligence unit 130 may determine that it is in an abnormal payment situation. The touch attributes included in the payment pattern may include an average value of the touch area of the touch input that a user applies normally, an average value of the touch pressure of the touch input, and the like.

Referring to (a) and (b) of FIG. 9B, the artificial intelligence unit 130 may execute the payment application in the first payment mode set to be executed by default on the basis of the execution request of the payment application inputted from a user. When a touch input having the predetermined touch attribute is applied to a card image included in the execution screen 930 of the payment application, the artificial intelligence unit 130 may display information 940 related to the card represented by the card image.

At this time, the artificial intelligence unit 130 may compare the touch attribute of the touch input with the touch attribute included in the payment pattern to determine whether a user who applies the touch input has legitimate rights. For example, in a normal distribution graph in which the touch area of the monitored touch input indicates a touch area included in the payment pattern, when the monitored touch area has an average value and a value of six sigma or more, the artificial intelligence unit 130 may determine that there is a high probability that it is in an abnormal payment situation. That is, the artificial intelligence unit 130 may determine that the user who applies the touch input is not a user having legitimate rights.

In this case, referring to (c) of FIG. 9B, the control unit 180 may switch the first payment mode to the second payment mode. That is, the control unit 180 may not display screen information 930 for inputting a payment password requested in the first payment mode on the display unit 151, and output screen information 950 for inputting fingerprint information requested in the second payment mode.

On the other hand, although not shown in the drawing, if the touch input having a predetermined touch attribute is applied to the home key while the card image is displayed on the execution screen 930 of the payment application, the control unit 180 may determine whether to perform a payment based on the touch attribute of the touch input. In this case, if the artificial intelligence unit 130 determines that the touch attribute included in the payment pattern is identical or similar to the touch input applied to the home key, the artificial intelligence unit 130 may determines that it is in a normal payment situation and deliver a control command to the control unit 180 to perform a normal payment. Accordingly, the control unit 180 may perform a payment based on the touch input.

On the contrary, if determining that the touch attribute included in the payment pattern is different from the touch input applied to the home key, the artificial intelligence unit 130 may determine that it is in an abnormal payment situation. In this case, the control unit 180 may execute the second payment mode, and perform a payment when the touch area of the touch input is equal to or greater than a predetermined level.

In addition, referring to FIG. 9C, when the fingerprint information for performing a payment is different from the fingerprint information included in the payment pattern, the artificial intelligence unit 130 may determine that it is in an abnormal payment situation. For example, as shown in (a) of FIG. 9C, when the fingerprint information of the thumb instead of the fingerprint information of the normally inputted index finger is inputted, the artificial intelligence unit 130 may determine that it is in an abnormal payment situation. In such a case, as shown in (b) of FIG. 9C, the control unit 180 may execute the second payment mode.

In the above, a method for detecting an abnormal payment situation and determining a payment mode based on a usual usage pattern of a terminal is described. Accordingly, the present invention may distinguish a user who wishes to make a payment using a terminal without an additional sensor or wireless communication unit, and thus may enhance payment security.

Figure 10A:
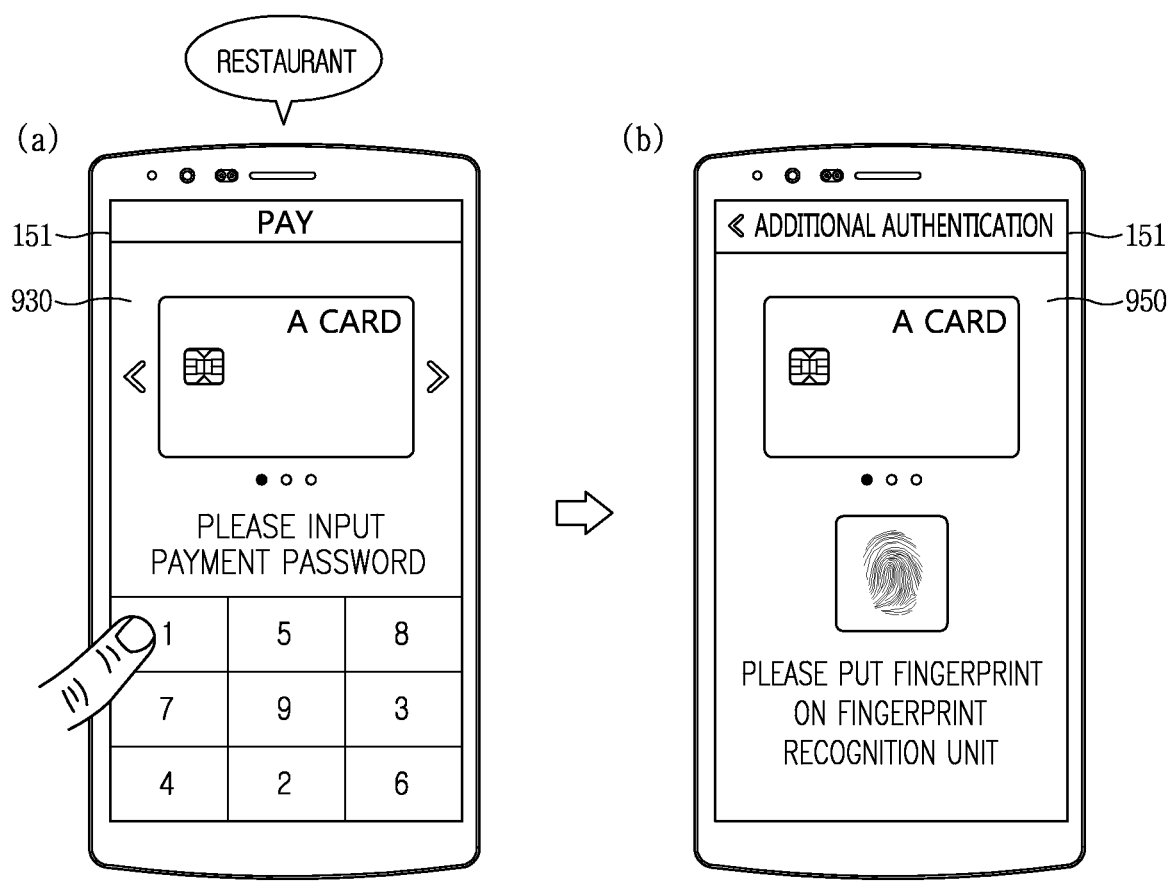
FIG. 10A is an embodiment for determining a payment mode according to a payment place and a payment card.
Figure 10B:
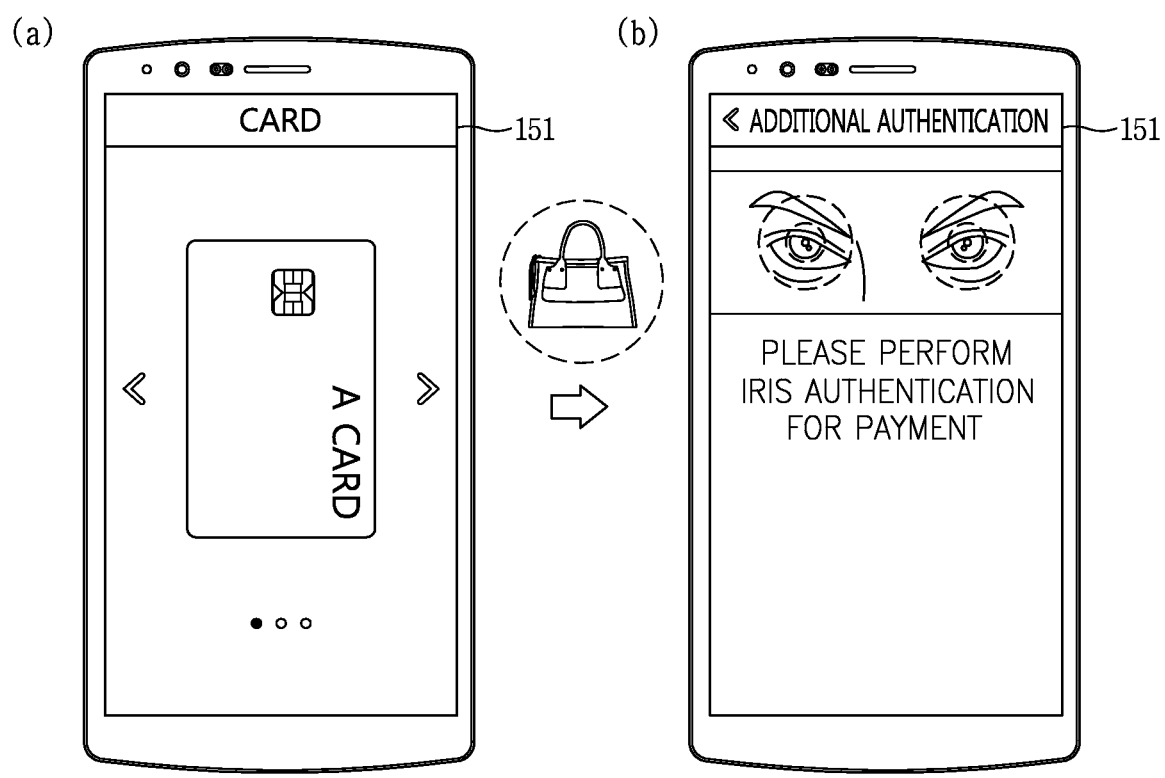
FIG. 10B is an embodiment for determining a payment mode according to a payment amount.

Hereinafter, a method for determining a payment mode based on a payment place and a payment amount will be described. FIG. 10A is an embodiment for determining a payment mode according to a payment place and a payment card, and FIG. 10B is an embodiment for determining a payment mode according to a payment amount.

In a mobile terminal according to the present invention, information on a payment card frequently used for each payment item may be included in the pre-learned payment pattern. A frequently used payment card may be a card frequently used for a specific payment item, such as a card with a higher discount rate for a certain item, a point accumulation card, and the like.

The artificial intelligence unit 130 may determine whether or not it is in a normal payment situation using the payment card and payment item information and the pre-learned payment pattern.

For example, referring to FIG. 10A, the artificial intelligence unit 130 may monitor situation information indicating a specific payment item to be paid with a specific payment card. In this case, if the monitored situation information is different from the pre-learned payment pattern, the artificial intelligence unit 130 may determine that it is in an abnormal payment situation.

Specifically, referring to (a) of FIG. 10A, the artificial intelligence unit 130 may monitor situation information for performing a payment of food and beverage with a card A while the first payment mode is in execution. At this time, the artificial intelligence unit 130 may determine whether or not food and beverage are included in the payment items of the card A on the payment pattern, and may determine that it is in an abnormal payment situation if the food and beverage are not included. In such a case, as shown in (b) of FIG. 10A, the control unit 180 may execute the second payment mode to request a high security level of authentication information when performing a payment.

In addition, referring to FIG. 10B, the artificial intelligence unit 130 may determine whether it is in a normal payment situation based on a payment amount related to a payment event.

More specifically, the control unit 180 may execute a payment mode having a higher security level as the payment amount related to the payment event becomes farther from the average value of the normal distribution. That is, the control unit 180 may execute a payment mode having a higher security level as the probability of not being a normal payment situation is higher.

For example, referring to (a) and (b) of FIG. 10B, the artificial intelligence unit 130 may monitor situation information for performing a payment for a very expensive bag. In this case, the control unit 180 may execute the second payment mode requiring the highest security level. Unlike this, when a price range corresponds to an average price range included in the payment pattern, the artificial intelligence unit 130 may execute the first payment mode having a low security level.

A mobile terminal according to an embodiment of the present invention may generate a payment pattern of a user by utilizing artificial intelligence and based on this, determine whether a situation where a payment event occurs is a normal payment situation in order to determine a payment mode to be executed by the payment event among payment modes having different security levels. Through this, the present invention may enhance the payment security by executing a payment mode that increases a security level in an abnormal payment situation.

In addition, when a payment event occurs, the present invention may utilize a usual mobile terminal usage pattern of a user to distinguish whether or not the user is a real user, thereby securing the payment security.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a memory configured to store a plurality of functions of the mobile terminal; and
a controller configured to:
learn a usage pattern of a legitimate user for a specific function by monitoring user patterns that include first input associated with the legitimate user occurring during different operation states, wherein the operation states include a specific state and a state in which an input for executing the specific function is to be received,
set the usage pattern of the legitimate user as a pre-learned pattern corresponding to the specific function,
determine whether a first user is the legitimate user based on a comparison of an input pattern with the pre-learned pattern, wherein the input pattern includes second input associated with the first user occurring during the operation states,
execute the specific function in a first mode having a first security standard when the first user is determined to be the legitimate user, and
execute the specific function in a second mode having a second security standard higher than the first security standard when the first user is determined to not be the legitimate user.

2. The mobile terminal of claim 1, further comprising:
a touch sensor configured to detect a touch, wherein the first input includes a plurality of touch inputs detected by the touch sensor.

3. The mobile terminal of claim 2, wherein the controller is further configured to:
analyze a touch area of the touch inputs, a touch pressure of the touch inputs, a touch speed of the touch inputs, information on a finger applying the touch inputs, the number of touches of the touch inputs, or touch type of the touch inputs.

4. The mobile terminal of claim 1, wherein the second mode is a mode in which an operation related to some of a plurality of menus related to the specific function is limited.

5. The mobile terminal of claim 4, wherein the controller is further configured to:

output notification information for requesting additional authentication when an execution request for an operation related to the limited menus is received.

6. The mobile terminal of claim 5, wherein the controller is further configured to:
execute the operation related to the limited menus when the additional authentication is performed.

7. The mobile terminal of claim 1, wherein:
the mobile terminal operates in any one state of a locked state and a released state, wherein the locked state is where an operation of the mobile terminal is limited according to a user input and the released state is where operation control of the mobile terminal is available according to a user input; and
wherein the controller is further configured to:
select any one of a plurality of operation modes having different security levels based on user input applied during the locked state, the selecting occurring when the locked state is switched to the released state based on the user input applied during the locked state.

8. The mobile terminal of claim 1, wherein the pre-learned pattern further includes a number of times of the first input, an input type of the first input, or an input method of the first input.

9. The mobile terminal of claim 1, further includes an artificial intelligence processor, wherein the artificial intelligence processor is configured to:
extract common components and difference components from a plurality of usage patterns, and classify a plurality of usage patterns based on the extracted common components and difference components; and
determine whether the first user has legitimate rights by calculating a probability corresponding to execute the specific function by the legitimate user for each extracted common component,
wherein the controller is further configured to execute the specific function in any one of a plurality of operation modes having different security levels based on the determination result,
wherein the artificial intelligence processor is further configured to:
assign different weights to each of the common components;
learn a payment pattern by combining the common components having the different assigned weights;
compare monitored information including at least one of information regarding an input pattern of the payment related control signals and surrounding environment of the mobile terminal at a time of the payment with the learned payment pattern; and
determine whether the payment is executed under a normal payment situation based on the comparison result,
wherein the information regarding the surrounding environment of the mobile terminal at the time of the payment includes at least one of location information, time information, card information of the payment, payment amount information, and payment item information.

10. The mobile terminal of claim 9, wherein the artificial intelligence processor is further configured to:
detect that a specific item is paid more than a predetermined number of times within a specific time period in a specific place;
identify the specific item in the specific place within the specific time period as the common components; and
assign different weights to each of the specific item, the specific place and the specific time period as the common components.

* * * * *